United States Patent
Ogawa

(10) Patent No.: US 8,525,453 B2
(45) Date of Patent: Sep. 3, 2013

(54) DAMPER SYSTEM FOR VEHICLE

(75) Inventor: Atsushi Ogawa, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 229 days.

(21) Appl. No.: 13/202,036

(22) PCT Filed: Jul. 8, 2009

(86) PCT No.: PCT/JP2009/062457
§ 371 (c)(1),
(2), (4) Date: Aug. 17, 2011

(87) PCT Pub. No.: WO2011/004471
PCT Pub. Date: Jan. 13, 2011

(65) Prior Publication Data
US 2012/0013277 A1 Jan. 19, 2012

(51) Int. Cl.
*H02K 7/065* (2006.01)

(52) U.S. Cl.
USPC ............. 318/368; 318/459; 318/145; 701/37; 280/5.5; 280/5.515; 280/124.1; 280/124.108; 280/124.105

(58) Field of Classification Search
USPC .................. 318/368, 459, 145; 280/124.108, 280/124.105, 124.1, 5.515, 5.5; 701/37
See application file for complete search history.

(56) References Cited

U.S. PATENT DOCUMENTS

| | | | | |
|---|---|---|---|---|
| 5,247,234 A * | 9/1993 | Bitzer et al. | ................ | 318/603 |
| 7,665,585 B2 * | 2/2010 | Alexandridis | ............... | 188/280 |
| 7,878,512 B2 * | 2/2011 | Horiuchi et al. | ............ | 280/5.522 |
| 7,902,781 B2 * | 3/2011 | Beneker et al. | ............... | 318/453 |
| 7,938,410 B2 * | 5/2011 | Buma et al. | ................ | 280/5.508 |
| 8,041,479 B2 * | 10/2011 | Buma | ............................ | 701/37 |

(Continued)

FOREIGN PATENT DOCUMENTS

| JP | 08 156561 | 6/1996 |
|---|---|---|
| JP | 2001 310736 | 11/2001 |

(Continued)

OTHER PUBLICATIONS

International Search Report issued Oct. 20, 2009 in PCT/JP09/62457 filed Jul. 8, 2009.

(Continued)

*Primary Examiner* — Rita Leykin
(74) *Attorney, Agent, or Firm* — Oblon, Spivak, McClelland, Maier & Neustadt, L.L.P.

(57) ABSTRACT

A damper system for a vehicle including an electromagnetic damper, wherein the electromagnetic damper includes: (i) an electromagnetic motor; (ii) a motion converting mechanism; and (iii) an external circuit including (A) a first connection passage, (B) a second connection passage, (C) a first-connection-passage-current adjuster, and (D) a second-connection-passage-current adjuster, wherein the damper system comprises an external-circuit controller including: (a) a main-adjuster control portion configured to perform, on one of the first-connection-passage-current adjuster and the second-connection-passage-current adjuster that is designated as a main adjuster, a first control for mainly damping the relative vibration of the sprung portion and the unsprung portion; and (b) an auxiliary-adjuster control portion configured to perform, on one of the first-connection-passage-current adjuster and the second-connection-passage-current adjuster that is designated as an auxiliary adjuster, a second control for assisting the damping of the relative vibration of the sprung portion and the unsprung portion by the first control.

15 Claims, 9 Drawing Sheets

(56) References Cited

U.S. PATENT DOCUMENTS

| | | | |
|---|---|---|---|
| 8,044,629 B2 * | 10/2011 | Fallahi | 318/611 |
| 8,090,500 B2 * | 1/2012 | Sekiya | 701/38 |
| 8,103,408 B2 * | 1/2012 | Inoue et al. | 701/37 |
| 8,265,825 B2 * | 9/2012 | Kajino et al. | 701/37 |
| 2004/0150361 A1 | 8/2004 | Hio et al. | |

FOREIGN PATENT DOCUMENTS

| | | |
|---|---|---|
| JP | 3 722 127 | 11/2005 |
| JP | 2007 037264 | 2/2007 |
| JP | 2007 290669 | 11/2007 |
| JP | 4 116 796 | 7/2008 |
| JP | 2009 29368 | 2/2009 |

OTHER PUBLICATIONS

English Translation of the International Preliminary Report on Patentability (Chapter II of the Patent Cooperation Treaty) issued on Jan. 8, 2012 in PCT/JP2009/062457 filed on Jul. 8, 2009.

\* cited by examiner

DAMPER SYSTEM FOR VEHICLE

TECHNICAL FIELD

The present invention relates to a damper system for a vehicle constituted by including an electromagnetic damper which includes an electromagnetic motor and which is configured to generate a damping force with respect to a motion of a sprung portion and an unsprung portion toward each other and a motion thereof away from each other.

BACKGROUND ART

In recent years, there has been developed, as a suspension system for a vehicle, a so-called electromagnetic suspension system, namely, a system that comprises, as one constituent element thereof, a damper system constituted by including an electromagnetic damper which includes an electromagnetic motor and which is configured to generate a damping force with respect to a motion of a sprung portion and an unsprung portion toward each other and a motion thereof away from each other, on the basis of an electromotive force generated in the electromagnetic motor. For instance, the following Patent Literatures disclose such a system.

CITATION LIST

Patent Literature

Patent Literature 1 JP-A-2007-290669
Patent Literature 2 JP-A-2007-37264
Patent Literature 3 JP-A-2001-310736

SUMMARY OF INVENTION

Technical Problem

As in the systems described in the above Patent Literatures, in the damper system constituted by including the electromagnetic damper, the electromagnetic damper generally includes a brushless DC motor as the electromagnetic motor and a drive circuit that includes a plurality of switching elements for driving the brushless DC motor. Such a damper system is relatively complicated in structure and expensive. The damper system including the electromagnetic damper is still under development and suffers from problems which arise from the basic structure of the ordinary damper system that has been proposed, such as the problem described above. Accordingly, there is plenty of room for improving the utility of the damper system. The present invention has been made in view of the situation described above. Therefore, the present invention aims at improving the utility of the damper system for a vehicle by proposing a novel structure of the damper system.

Solution to Problem

To solve the problem indicated above, a first invention provides a damper system for a vehicle which is mounted on the vehicle and which comprises an electromagnetic damper configured to generate a damping force with respect to a motion of a sprung portion and an unsprung portion toward each other and a motion thereof away from each other,
wherein the electromagnetic damper includes:
an electromagnetic motor;
a motion converting mechanism configured to convert the motions of the sprung portion and the unsprung portion toward and away from each other into a motion of the electromagnetic motor and vice versa; and
an external circuit disposed outside the electromagnetic motor and including (A) a first connection passage in which an electric current is allowed to flow from a first terminal as one of two terminals of the electromagnetic motor to a second terminal as the other of the two terminals while an electric current is prohibited from flowing from the second terminal to the first terminal and (B) a second connection passage in which the electric current is allowed to flow from the second terminal to the first terminal of the electromagnetic motor while the electric current is prohibited from flowing from the first terminal to the second terminal,
wherein the electromagnetic damper is configured to generate the damping force that depends on an electromotive force of the electromagnetic motor, with respect to the motion of the sprung portion and the unsprung portion toward each other by permitting a generated current by the electromagnetic motor to flow through the first connection passage and with respect to the motion of the sprung portion the unsprung portion away from each other by permitting the generated current by the electromagnetic motor to flow through the second connection passage,
wherein the external circuit further includes: (C) a first-connection-passage-current adjuster provided in the first connection passage and configured to adjust the electric current that flows from the first terminal to the second terminal; and (D) a second-connection-passage-current adjuster provided in the second connection passage and configured to adjust the electric current that flows from the second terminal to the first terminal,
wherein the damper system comprises an external-circuit controller configured to control an electric current that flows in the electromagnetic motor by controlling the external circuit,
wherein the external-circuit controller is configured to control the generated current caused by the motion of the sprung portion and the unsprung portion toward each other by controlling the first-connection-passage-current adjuster and to control the generated current caused by the motion of the sprung portion and the unsprung portion away from each other by controlling the second-connection-passage-current adjuster,
wherein the external-circuit controller includes:
(a) a main-adjuster control portion which is configured to designate the first-connection-passage-current adjuster as a main adjuster where a sprung-resonance-frequency-range component that is a component of a relative vibration of the sprung portion and the unsprung portion in a sprung resonance frequency range is a value indicative of the motion of the sprung portion and the unsprung portion toward each other, to designate the second-connection-passage-current-adjuster as the main adjuster where the sprung-resonance-frequency-range component is a value indicative of the motion of the sprung portion and the unsprung portion away from each other, and to perform, on one of the first-connection-passage-current adjuster and the second-connection-passage-current adjuster that is designated as the main adjuster, a first control for mainly damping the relative vibration of the sprung portion and the unsprung portion; and
(b) an auxiliary-adjuster control portion which is configured to designate the second-connection-passage-current adjuster as an auxiliary adjuster where the sprung-resonance-frequency-range component is the value indicative of the motion of the sprung portion and the unsprung portion toward each other, to designate the first-connection-passage-current adjuster as the auxiliary adjuster where the sprung-resonance-frequency-range component is the value indicative of the motion of the sprung portion and the unsprung portion away from each other, and to perform, on one of the first-connection-passage-current adjuster and the second-connection-passage-current adjuster that is designated as the auxiliary adjuster, a second control for assisting the damping of the relative vibration of the sprung portion and the unsprung portion by the first control.

Further, a second invention provides a damper system for a vehicle which comprises an electromagnetic damper, wherein the electromagnetic damper includes:
(i) an electromagnetic motor;
(ii) a motion converting mechanism; and
(iii) an external circuit including (A) a first connection passage, (B) a second connection passage, (C) a first-connection-passage-current adjuster, and (D) a second-connection-passage-current adjuster, wherein the first-connection-passage-current adjuster and the second-connection-passage-current adjuster are constituted by respective switching elements each configured to place a corresponding one of the first connection passage and the second connection passage selectively in an electrically connected state in which an electric current flows therethrough and in an electrically shut-off state in which the electric current does not flow therethrough, wherein an external-circuit controller is configured to control the generated current by the electromagnetic motor by controlling a duty ratio of each of the switching elements and is configured not to change the duty ratio of each of the switching elements that respectively constitute the first-connection-passage-current adjuster and the second-connection-passage-current adjuster, depending upon through which one of the first connection passage and the second connection passage the generated current is flowing.

Advantageous Effects of Invention

The relative vibration of the sprung portion and the unsprung portion contains a component having a relatively high frequency. Where the motion of the sprung portion and the unsprung portion toward each other (i.e., approaching motion) and the motion of the sprung portion and the unsprung portion away from each other (i.e., separating motion) alternate at very short intervals, it is difficult to change the control of a current adjuster depending upon the direction of the relative motion of the sprung portion and the unsprung portion. In the damper system according to the first invention, it is regarded that the relative vibration of the sprung portion and the unsprung portion is composed of vibration components of various frequencies, and the two current adjusters are designated as one and the other of master (main adjuster) and slave (auxiliary adjuster) on the basis of the direction of the motion indicated by a value of a component in the sprung resonance frequency range among various frequencies, so as to control the two current adjusters independently of each other. In other words, the control can be switched not on the basis of an actual direction of the relative motion of the sprung portion and the unsprung portion, but on the basis of the direction of the motion indicated by the value of the sprung-resonance-frequency-range component. Accordingly, the damper system according to the first invention is capable of effectively damping the relative vibration without suffering from the problem indicated above. In the damper system according to the second invention, the duty ratio of each of the switching elements is kept unchanged without being changed irrespective of whether or not the generated current is flowing through a corresponding one of the connection passages, and the amount of the generated current is adjustable when the generated current flows through the corresponding connection passage. Accordingly, the damper system according to the second invention is capable of effectively damping the relative vibration without suffering from the problem indicated above. Hence, the damper systems according to the present invention have high utility owing to such advantages.

FORMS OF INVENTION

There will be explained various forms of an invention which is considered claimable (hereinafter referred to as "claimable invention" where appropriate). Each of the forms of the invention is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following descriptions of various forms and preferred embodiments. It is to be further understood that any form in which one or more elements is/are added to or deleted from any one of the following forms may be considered as one form of the claimable invention.

In the following forms, a form in which the technical features of the forms (1), (21), and (27) are combined corresponds to claim 16. A form in which the technical features of the forms (22) and (23) are added to claim 16 corresponds to claim 17. A form in which the technical feature of the form (29) is added to claim 16 corresponds to claim 18. A form in which the technical feature of the form (30) is added to claim 18 corresponds to claim 19. A form in which the technical feature of the form (31) is added to claim 18 corresponds to claim 20. A form in which the technical feature of the form (32) is added to claim 18 corresponds to claim 21. A form in which the technical features of the forms (25) and (26) are added to claim 16 corresponds to claim 22. A form in which the technical feature of the form (34) is added to claim 16 corresponds to claim 23. A form in which the technical feature of the form (11) is added to claim 16 corresponds to claim 24. A form in which the technical feature of the form (12) is added to claim 24 corresponds to claim 25. A form in which the technical feature of the form (14) is added to claim 24 corresponds to claim 26. A form in which the technical feature of the form (4) is added to claim 16 corresponds to claim 27. A form in which the technical feature of the form (6) is added to claim 27 corresponds to claim 28. A form in which the technical feature of the form (28) is added to claim 16 corresponds to claim 29. A form in which the technical features of the forms (1), (21), (25), and (26) are combined corresponds to claim 30.

(1) A damper system for a vehicle which is mounted on the vehicle and which comprises an electromagnetic damper configured to generate a damping force with respect to a motion of a sprung portion and an unsprung portion toward each other and a motion thereof away from each other,
wherein the electromagnetic damper includes:
an electromagnetic motor;
a motion converting mechanism configured to convert the motions of the sprung portion and the unsprung portion toward and away from each other into a motion of the electromagnetic motor and vice versa; and an external circuit disposed outside the electromagnetic motor and including (A) a first connection passage in which an electric current is allowed to flow from a first terminal as one of two terminals of the electromagnetic motor to a second terminal as the other of the two terminals while an electric current is prohibited from flowing from the second terminal to the first terminal and (B) a second connection passage in which the electric current is allowed to flow from the second terminal to the first terminal of the electromagnetic motor while the electric current is prohibited from flowing from the first terminal to the second terminal, and wherein the electromagnetic damper is configured to generate the damping force that depends on an electromotive force of the electromagnetic motor, with respect to the motion of the sprung portion and the unsprung portion toward each other by permitting a generated current by the electromagnetic motor to flow through the first connection passage and with respect to the motion of the sprung portion the unsprung portion away from each other by permitting the generated current by the electromagnetic motor to flow through the second connection passage.

In this form, the passage in the external circuit through which the generated current by the electromagnetic motor flows in the motion of the sprung portion and the unsprung portion toward each other (i.e., approaching motion) and the passage in the external circuit through which the generated current by the electromagnetic motor flows in the motion of the sprung portion and the unsprung portion away from each other (i.e., separating motion) are made different from each other. That is, as will be later explained in detail, the damping characteristic with respect to the approaching motion of the sprung portion and the unsprung portion and the damping characteristic with respect to the separating motion thereof can be easily made different from each other by varying a resistance to the electric current that flows through the first connection passage and a resistance to the electric current that flows through the second connection passage from each other or by adjusting electric current amounts flowing through the respective first connection passage and the second connection passage.

The "electromagnetic motor" in this form is not particularly limited but various sorts of electromagnetic motors may be employed. In terms of simplicity of the structure of the system, it is preferable to employ an electromagnetic motor having two terminals, e.g., a brushed DC motor and a shingle-phase motor. Even in a motor configured such that a direction of its generated current does not change in accordance with the direction of the relative motion of the sprung portion and the unsprung portion, there is a way of reversing the direction of the generated current in accordance with the direction of the relative motion. In terms of simplicity of the structure of the system, however, the "electromagnetic motor" in this form is preferably configured such that the direction of the generated current in accordance with the direction of the relative motion is reversed owing to its own structure. In other words, the motor is preferably configured such that one of the two terminals which is on a high-potential side and the other of the two terminals which is on a low-potential side are switched in accordance with the direction of the relative motion. Moreover, the motor is preferably configured such that its rotational direction is reversed by switching connection between the two terminals and a high-potential-side terminal and a low-potential-side terminal of a battery. In view of the above, the "electromagnetic motor" in this form may be a brushed DC motor utilizing permanent magnets, for instance.

The "motion converting mechanism" in this form is not particularly limited in its structure and is configured to convert the approaching motion of the sprung portion and the unsprung portion and the separating motion thereof into the motion of the electromagnetic motor and to convert the motion of the electromagnetic motor into the approaching motion of the sprung portion and the unsprung portion and the separating motion thereof. Where the electromagnetic damper is configured to generate the damping force that depends only on the electromotive force generated in the electromagnetic motor, the motion converting mechanism converts the approaching motion and the separating motion into the motion of the electromagnetic motor. Where a portion of the electromagnetic damper composed of mechanical components such as the motion converting mechanism and the electromagnetic motor is defined as a damper main body, the damper main body is not particularly limited in its structure. Where the electromagnetic motor is configured to rotate and the damper main body is constituted by a sprung-side unit connected to the sprung portion and an unsprung-side unit which is connected to the unsprung portion and which is configured to be moved relative to the sprung-side unit in accordance with the approach and separation of the sprung portion and the unsprung portion, a screw mechanism may be employed as the motion converting mechanism, and a relative motion of the sprung-side unit and the unsprung-side unit in the vertical direction may be converted by the screw mechanism into the rotational motion of the electromagnetic motor of a rotary type. More specifically, the damper main body may be constituted as an electromagnetic shock absorber configured to be expandable and contractible and to generate a force with respect to the expansion and contraction. Further, the electromagnetic motor may be configured to rotate, the damper main body may be constituted by including an arm which extends generally in the vehicle width direction and which is rotatably connected at opposite ends thereof respectively to the sprung portion and the unsprung portion, and the damper main body may be configured such that the electromagnetic motor rotates by rotation of the end of the arm connected to the sprung portion. In such a structure, the arm may be considered as one constituent element of the motion converting mechanism.

(2) The damper system according to the form (1), wherein the first connection passage includes a first rectifier configured to allow the electric current to flow from the first terminal to the second terminal and to prohibit the electric current from flowing from the second terminal to the first terminal, and wherein the second connection passage includes a second rectifier configured to allow the electric current to flow from the second terminal to the first terminal and to prohibit the electric current from flowing from the first terminal to the second terminal.

This form embodies a structure by which the electric current flows in only one direction in each of the two connection passages. Each of the first and second rectifiers may be formed as a diode that allows the electric current to flow in only one direction.

(3) The damper system according to the form (1) or (2), wherein the external circuit is configured such that a resistance to the electric current that flows through the first connection passage and a resistance to the electric current that flows through the second connection passage are made different from each other.

In this form, the damping characteristic with respect to the approaching motion of the sprung portion and the unsprung portion toward each other and the damping characteristic with respect to the separating motion thereof away from each other are made different from each other, namely, the damping force with respect to the approaching motion and the damping force with respect to the separating motion are made different from each other. This form is not limited to an arrangement in which resistance values of the respective two connection passages are mutually different but may include an arrangement in which the electric current amounts flowing through the respective two connection passages are mutually different where a speed of the approaching motion of the sprung portion and the unsprung portion and a speed of the separating motion thereof are the same. In the latter arrangement, as later explained in detail, there may be provided, in each of the two connection passages, a current adjuster for adjusting the electric current flowing therethrough so as to adjust the electric current amounts flowing through the respective two connection passages, whereby the damping force with respect to the approaching motion and the damping force with respect to the separating motion can be made different from each other. Such an arrangement, however, needs a control of the current adjusters. In terms of simplification of the structure of the damper system, it is preferable to employ an arrangement in which resistors having mutually different resistance values are provided in one and the other of the first connection passage and the second connection passage.

(4) The damper system according to any one of the forms (1)-(3), wherein the external circuit includes a battery-device connection passage in which an electric current is allowed to flow from one of the two terminals of the electromagnetic motor that is at a high potential to a high-potential-side terminal of a battery device installed on the vehicle and an electric current is allowed to flow from a low-potential-side terminal of the battery device to the other of the two terminals of the electromagnetic motor that is at a low potential, and wherein the damper system is configured such that a part of the generated current by the electromagnetic motor flows through the battery-device connection passage where the electromotive force of the electromagnetic motor exceeds a voltage of the battery device.

In this form, at least a part of the generated power of the electromagnetic motor is regenerated to the battery device. According to the damper system of this form, the battery device is charged or the power supply to the battery device is supplemented, thereby enhancing the efficiency of the battery device. The "battery device" in this form may be a device to supply an electric power to: a power source for driving the vehicle; electrical equipment such as lamps and an audio system; or other device installed on the vehicle. The "battery device" may be a device for exclusive use of the electromagnetic damper. Further, the "battery device" may be a battery or a capacitor such as an electric double-layer capacitor.

(5) The damper system according to the form (4), wherein the battery-device connection passage includes:

a first high-potential-side connection passage in which an electric current is allowed to flow from the first terminal to the high-potential-side terminal of the battery device while an electric current is prohibited from flowing from the high-potential-side terminal of the battery device to the first terminal;

a second high-potential-side connection passage in which an electric current is allowed to flow from the second terminal (102) to the high-potential-side terminal of the battery device while an electric current is prohibited from flowing from the high-potential-side terminal of the battery device to the second terminal;

a second low-potential-side connection passage in which an electric current is allowed to flow form the low-potential-side terminal of the battery device to the first terminal while an electric current is prohibited from flowing from the first terminal to the low-potential-side terminal of the battery device, and a first low-potential-side connection passage in which an electric current is allowed to flow from the low-potential-side terminal of the battery device to the second terminal while an electric current is prohibited from flowing from the second terminal to the low-potential-side terminal of the battery device.

In this form, the structure of the battery-device connection passage is embodied. In this form, the passage through which the electric current flows is changed depending on which one of the two terminals of the electromagnetic motor is at a high potential. Where the two connection passages have the respective rectifiers as described above, it is possible to utilize the first rectifier as a constituent element of one of the first high-potential side connection passage and the first low-potential side connection passage and to utilize the second rectifier as a constituent element of one of the second high-potential side connection passage and the second low-potential side connection passage. Such an arrangement simplifies the structure of the external circuit and accordingly the structure of the damper system.

(6) The damper system according to the form (4) or (5), wherein the external circuit includes a battery-device-connection-passage-current adjuster configured to adjust the electric current that flows through the battery-device connection passage.

As the "battery-device-connection-passage-current adjuster" in this form, it is possible to employ a variable resistor, a switching element such as a transistor, and the like. This form enables adjustment of the regenerative current to the battery device which is the at least part of the generated current of the electromagnetic motor. This form may be arranged such that the battery-device-connection-passage-current adjuster is controlled on the basis of a charged amount of the battery device, for instance. (The charged amount can be considered as a residual amount or a remaining energy amount.) More specifically, this form may be arranged such that the larger the charged amount of the battery device, the smaller the regenerative current.

In an instance where the voltage of the battery device is lowered due to an increase in the electric power supplied from the battery device to various equipment installed on the vehicle, for instance, the electric current is likely to flow to the battery device and the regenerative current that is the part of the generated current to flow to the battery device becomes large, as compared with an instance where the voltage of the battery device is high. In other words, when the voltage of the battery device is lowered, the damping force of the electromagnetic damper becomes large, as compared with when the voltage of the battery device is high. This form can be arranged such that the damping force of the electromagnetic damper is restrained from increasing by making the regenerative current small upon the voltage decrease of the battery device by means of the above-indicated battery-device-connection-passage-current adjuster.

(11) The damper system according to any one of the forms (1)-(6), wherein the external circuit includes: a first resistor which is provided in the first connection passage and which functions as a resistance to the electric current that flows from the first terminal to the second terminal; and a second resistor which is provided in the second connection passage and which functions as a resistance to the electric current that flows from the second terminal to the first terminal.

In this form, a resistor is provided in each of the two connection passages. By appropriately setting resistance values of the two resistors, the damping characteristic with respect to the approaching motion of the sprung portion and the unsprung portion toward each other and the damping characteristic with respect to the separating motion of the sprung portion and the unsprung portion away from each other can be made respectively appropriate. Each of the "first resistor" and the "second resistor" in this form may be a fixed resistor or a variable resistor. Where the variable resistor is employed as each of the two resistors, it is possible to change the damping characteristic with respect to the approaching motion and the damping characteristic with respect to the separating motion independently of each other in accordance with the running state of the vehicle or the like, as later explained in detail.

(12) The damper system according to the form (11), wherein a resistance value of the first resistor and a resistance value of the second resistor are made different from each other.

This form realizes the above-indicated form in which the resistances to the electric currents flowing through the respective two connection passage are made mutually different, by providing the resistors having mutually different resistance values in the respective connection passages. This form is preferable in terms of simplification of the structure of the damper system as described above.

(13) The damper system according to the form (12), wherein the resistance value of the first resistor is made larger than the resistance value of the second resistor.

In this form, the damping force with respect to the approaching motion is made smaller than the damping force with respect to the separating motion. The input to the electromagnetic damper at a time when the wheel passes on a projection of the road surface is larger than the input to the electromagnetic damper at a time when the wheel passes on a depression of the road surface. According to this form, the damping force with respect to the approaching motion of the sprung portion and the unsprung portion toward each other upon passing of the wheel on the projection of the road surface is made small, thereby effectively mitigating a shock or impact applied to the sprung portion when the wheel passes on the projection.

(14) The damper system according to any one of the forms (11)-(13),
wherein the external circuit includes:
a first-resistor bypass passage which bypasses the first resistor;
a first auxiliary resistor which is provided in the first-resistor bypass passage and which functions as a resistance to an electric current that flows through the first-resistor bypass passage;
a first open/close device configured to place the first-resistor bypass passage selectively in a state in which the electric current flows therethrough and in a state in which the electric current does not flow therethrough;
a second-resistor bypass passage which bypasses the second resistor;
a second auxiliary resistor which is provided in the second-resistor bypass passage and which functions as a resistance to an electric current that flows through the second-resistor bypass passage;
a second open/close device configured to place the second-resistor bypass passage selectively in a state in which the electric current flows therethrough and in a state in which the electric current does not flow therethrough,
wherein the first-resistor bypass passage is placed by the first open/close device in the state in which the electric current does not flow therethrough under normal conditions and in the state in which the electric current flows therethrough in case of a failure that the electric current does not flow through the first resistor, and
wherein the second-resistor bypass passage is placed by the second open/close device in the state in which the electric current does not flow therethrough under normal conditions and in the state in which the electric current flows therethrough in case of a failure that the electric current does not flow through the second resistor.

The resistors provided in the respective two connection passages may suffer from a failure in which the electric current fails to pass therethrough due to a break or disconnection therein or the like by heat generation. When such a failure occurs, the generated current by the electromagnetic motor does not flow through the resistors. Accordingly, no damping force is generated with respect to the motions of the sprung portion and the unsprung portion toward and away from each other, so that the vehicle stability may be deteriorated. In this form, even where any of the resistors suffer from the failure in which the electric current does not pass therethrough, the electric current flows through the bypass passage which bypasses the failure-suffering resistor and passes through the auxiliary resistor provided in the bypass passage. Therefore, this form realizes the damper system excellent in terms of failsafe operation.

It is not particularly limited how to detect whether or not the "failure that the electric current does not flow through the resistor" described in this form has occurred. More specifically, it is not particularly limited how to detect whether or not any of the resistors is in a state in which the electric current does not pass therethrough in spite of the fact that the electromagnetic motor is being operated. For instance, the occurrence of the failure may be judged by detection of the approaching or separating motion of the sprung portion and the unsprung portion based on a change in the rotational angle of the electric motor and at the same time by detection of the state in which the electric current does not pass through the resistor provided in the connection passage through which the generated current flows in the motion. When such a judgment is made, the open/close device may place the bypass passage that bypasses the failure-suffering resistor in a state in which the electric current flows therethrough. For making the judgment described above, there may be utilized a sensor configured to directly detect the rotational angle of the electromagnetic motor. Alternatively, the rotational angle of the electromagnetic motor may be detected indirectly by a sensor or the like configured to detect the distance between the sprung portion and the unsprung portion. Further, there may be utilized a sensor configured to directly detect the electric current passing through the resistor. Alternatively, whether or not the electric current has passed through the resistor may be detected indirectly by a sensor or the like configured to measure a potential, a voltage or the like at a certain point of the connection passage.

(21) The damper system according to any one of the forms (1)-(14),
wherein the external circuit includes: a first-connection-passage-current adjuster provided in the first connection passage and configured to adjust the electric current that flows from the first terminal to the second terminal; and a second-connection-passage-current adjuster provided in the second connection passage and configured to adjust the electric current that flows from the second terminal to the first terminal, wherein the damper system comprises an external-circuit controller configured to control an electric current that flows in the electromagnetic motor by controlling the external circuit, and wherein the external-circuit controller is configured to control the generated current caused by the motion of the sprung portion and the unsprung portion toward each other by controlling the first-connection-passage-current adjuster and to control the generated current caused by the motion of the sprung portion and the unsprung portion away from each other by controlling the second-connection-passage-current adjuster.

The "external-circuit controller" in this form may be configured so as to control the generated current by the electromagnetic motor and also a supply current from a battery device in an instance where the electromagnetic motor is connected to the battery device. Where the electromagnetic damper is configured to generate the damping force that depends mainly on the electromotive force generated in the electromagnetic motor, the external-circuit controller is for controlling a flow of the generated current by the electromagnetic motor. The "flow of the generated current" is a concept that includes a direction in which the generated current flows, an amount of the generated current and the like.

Each of the "first-connection-passage-current adjuster" and the "second-connection-passage-current adjuster" in this form is configured to adjust an amount of the electric current per a preset time that flows through the corresponding connection passage, and is controlled by the above-indicated external-circuit controller. That is, the external-circuit controller controls the amount of the generated current caused by the approaching motion of the sprung portion and the unsprung portion toward each other utilizing the first-connection-passage-current adjuster, thereby changing the damping force with respect to the approaching motion. Further, the external-circuit controller controls the amount of the generated current caused by the separating motion of the sprung portion and the unsprung portion away from each other utilizing the second-connection-passage-current adjuster, thereby changing the damping force with respect to the separating motion. As each of the "first-connection-passage-current adjuster" and the "second-connection-passage-current adjuster", a variable resistor or a switching element such as a transistor is employable, for instance. That is, an arrangement in which a variable resistor is employed as each of the resistors provided in the respective connection passages in the above-indicated form can be considered as one arrangement of this form. However, for controlling the generated current caused by the relative motion of the sprung portion and the unsprung portion in accordance with the vehicle running state and the like, each current adjuster is preferably constituted by a switching element that is capable of executing pulse driving or the like, as explained below.

Here, there is considered a damper system in which a single connection passage is provided for connecting two terminals of an electromagnetic motor and a single current adjuster is provided in the connection passage, namely, a system in which the generated current of the motor caused by the approaching motion and the generated current of the motor caused by the separating motion flow through the common connection passage in mutually opposite directions. In such a damper system, there may arise a problem of responsiveness in the control of the current adjuster, namely, there may occur a time lag between a time point of issuance of a command from an external-circuit controller to the current adjuster and a time point of initiation of adjustment of the electric current by the current adjuster based on the command. To be more specific, the relative vibration of the sprung portion and the unsprung portion contains a component having a relatively high frequency. Where the approaching motion and the separating motion alternate at very short intervals, it is difficult to change the control of the current adjuster depending upon the direction of the relative motion of the sprung portion and the unsprung portion.

In contrast, in the damper system described in this form, the generated current caused by the approaching motion flows through the first connection passage while the generated current caused by the separating motion flows through the second connection passage, thereby eliminating a need of switching the control of the first-connection-passage-current adjuster and the second-connection-passage-current adjuster depending upon the direction of the relative motion of the sprung portion and the unsprung portion. Accordingly, the relative vibration of the sprung portion and the unsprung portion can be effectively damped. As later explained in detail, the external-circuit controller may be configured to control the first-connection-passage-current adjuster and the second-connection-passage-current adjuster in accordance with the vehicle behavior, the vehicle running state and the like. By controlling the two adjusters so as to have respective different roles, the present damper system can exhibit excellent damping performance. More specifically, one of the two current adjusters may be controlled so as to damp a vibration in a sprung resonance frequency range, thereby enhancing operability and stability of the vehicle (hereinafter referred to as "operating stability" where appropriate) while the other current adjuster may be controlled so as to damp a vibration in an unsprung resonance frequency range, thereby enhancing ride comfort of the vehicle. Therefore, the system in this form ensures a good balance between the ride comfort and the operating stability which are difficult to be realized at the same time, thereby ensuring high utility.

(22) The damper system according to the form (21), wherein the external-circuit controller is configured to control the first-connection-passage-current adjuster and the second-connection-passage-current adjuster so as to control a damping coefficient of the electromagnetic damper.

In this form, the damping coefficient with respect to the approaching motion of the sprung portion and the unsprung portion toward each other is controlled by controlling the first-connection-passage-current adjuster while the damping coefficient with respect to the separating motion of the sprung portion and the unsprung portion away from each other is controlled by controlling the second-connection-passage-current adjuster. The "damping coefficient of the electromagnetic damper" described in this form is an index of an ability of the electromagnetic damper to generate the damping force and a basis of the damping force to be generated by the electromagnetic damper. In general, the damping coefficient of a damper is represented by a magnitude of the damping force with respect to the speed of the relative motion of the sprung portion and the unsprung portion.

(23) The damper system according to the form (22), wherein the external-circuit controller is configured to control the first-connection-passage-current adjuster and the second-connection-passage-current adjuster, such that the damping coefficient of the electromagnetic damper with respect to the motion of the sprung portion and the unsprung portion toward each other and the damping coefficient of the electromagnetic damper with respect to the motion of the sprung portion and the unsprung portion away from each other are made different from each other.

This form realizes the above-indicated form in which the resistances to the electric currents flowing through the respective two connection passages are made mutually different, by adjusting the electric current amounts flowing through the respective two connection passages. In an arrangement in which are combined this form and the above-indicated form wherein the resistors are provided in the respective two connection passages, it is preferable to determine a basic resistance value of each of the two connection passages in a case wherein the two current adjusters are not controlled (in a case wherein a state in which the electric currents flow through the respective connection passages), by making the resistance values of the respective two current adjusters mutually different, whereby the resistances to the electric currents flowing through the respective two connection passages are made mutually different. In the thus configured arrangement, since the resistances to the electric currents flowing through the respective two connection passages are made mutually different, the approaching motion of the sprung portion and the unsprung portion and the separating motion thereof can be respectively effectively damped even in the event of a failure in which the two current adjusters cannot be controlled.

(24) The damper system according to the form (23), wherein the external-circuit controller is configured to control the first-connection-passage-current adjuster and the second-connection-passage-current adjuster, such that the damping coefficient with respect to the motion of the sprung portion and the unsprung portion toward each other is made smaller than the damping coefficient with respect to the motion of the sprung portion and the unsprung portion away from each other.

In this form, the damping force with respect to the approaching motion is made smaller than the damping force with respect to the separating motion. This form effectively mitigates a shock or impact applied to the sprung portion by the unsprung portion that approaches the sprung portion when the wheel passes on a projection of the road surface.

(25) The damper system according to any one of the forms (21)-(24), wherein the first-connection-passage-current adjuster and the second-connection-passage-current adjuster are constituted by respective switching elements each configured to place a corresponding one of the first connection passage and the second connection passage selectively in an electrically connected state in which an electric current flows therethrough and in an electrically shut-off state in which the electric current does not flow therethrough, and wherein the external-circuit controller is configured to control the generated current by the electromagnetic motor by controlling each of the switching elements such that the electrically connected state and the electrically shut-off state are alternately and repeatedly established and by controlling a duty ratio of each of the switching elements that is a ratio determined on the basis of a time during which the electrically connected state is established and a time during which the electrically shut-off state is established.

In this form, each current adjuster is limited to a switching element, and the external-circuit controller is configured to execute a Pulse Width Modulation (PWM) control of the switching element. For instance, where the electromagnetic motor is a DC motor and its operational speed is proportional to a force to be generated by the motor, namely, where the damper system is configured such that the speed of the relative motion of the sprung portion and the unsprung portion is proportional to the damping force of the electromagnetic damper, the damping coefficient of the electromagnetic damper can be changed by changing the duty ratio of each switching element, namely, by changing a ratio of a time during which the electrically connected state is established with respect to a pulse pitch which is a sum of the time during which the electrically connected state is established and the time during which the electrically shut-off state is established. Therefore, this form can be the above-indicated forms in which the damping coefficient is controlled.

(26) The damper system according to the form (25), wherein the external-circuit controller is configured not to change the duty ratio of each of the switching elements that respectively constitute the first-connection-passage-current adjuster and the second-connection-passage-current adjuster, depending upon through which one of the first connection passage and the second connection passage the generated current is flowing.

This form may be considered as a form in which the duty ratio of each of the switching elements that respectively constitute the first-connection-passage-current adjuster and the second-connection-passage-current adjuster is not changed depending upon whether or not the generated current is flowing through a corresponding one of the first connection passage and the second connection passage. In this form, where the duty ratio of each switching element is kept unchanged irrespective of whether or not the generated current is flowing through a corresponding one of the connection passages, the amount of the generated current is adjusted when the generated current flows through the corresponding connection passage. According to this form, even if the approaching motion and the separating motion alternate at very short intervals, the responsiveness in the control of the switching elements explained above does not cause any problem, and the relative vibration of the sprung portion and the unsprung portion can be effectively damped.

(27) The damper system according to any one of the forms (21)-(26), wherein the external-circuit controller includes:

a main-adjuster control portion which is configured to designate the first-connection-passage-current adjuster as a main adjuster where a sprung-resonance-frequency-range component that is a component of a relative vibration of the sprung portion and the unsprung portion in a sprung resonance frequency range is a value indicative of the motion of the sprung portion and the unsprung portion toward each other, to designate the second-connection-passage-current-adjuster as the main adjuster where the sprung-resonance-frequency-range component is a value indicative of the motion of the sprung portion and the unsprung portion away from each other, and to control one of the first-connection-passage-current adjuster and the second-connection-passage-current adjuster that is designated as the main adjuster; and an auxiliary-adjuster control portion which is configured to designate the second-connection-passage-current adjuster as an auxiliary adjuster where the sprung-resonance-frequency-range component is the value indicative of the motion of the sprung portion and the unsprung portion toward each other, to designate the first-connection-passage-current adjuster as the auxiliary adjuster where the sprung-resonance-frequency-range component is the value indicative of the motion of the sprung portion and the unsprung portion away from each other, and to control one of the first-connection-passage-current adjuster and the second-connection-passage-current adjuster that is designated as the auxiliary adjuster.

In this form, it is regarded that the relative vibration of the sprung portion and the unsprung portion is composed of vibration components of various frequencies, and one of the two current adjusters that mainly damps the relative vibration is designated as the main adjuster on the basis of a direction of the motion indicated by the value of the component in the sprung resonance frequency range among the vibration components. In other words, it is preferable that the "main adjuster" in this form have a function of damping the sprung-resonance-frequency-range component mainly for damping the sprung-resonance-frequency-range component. On the other hand, the "auxiliary adjuster" in this form can have various functions explained below in detail for aiding or assisting the main adjuster. Thus, the relative vibration of the sprung portion and the unsprung portion can be effectively damped.

(28) The damper system according to the form (27), wherein the main-adjuster control portion is configured to control the one of the first-connection-passage-current adjuster and the second-connection-passage-current adjuster that is designated as the main adjuster, such that a damping coefficient of the electromagnetic damper becomes a value suitable for damping the sprung-resonance-frequency-range component.

This form permits the main adjuster to have a function of damping the sprung-resonance-frequency-range component. In this form, the damping coefficient when controlling the first-connection-passage-current adjuster and the damping coefficient when controlling the second-connection-passage-current adjuster may or may not be the same. When the damping coefficients are mutually different, the damping coefficients may be determined such that the damping coefficient when controlling the first-connection-passage-current adjuster is a value suitable for damping the approaching motion while the damping coefficient when controlling the second-connection-passage-current adjuster is a value suitable for damping the separating motion.

(29) The damper system according to the form (27) or (28), wherein the auxiliary-adjuster control portion is configured to control the one of the first-connection-passage-current adjuster and the second-connection-passage-current adjuster that is designated as the auxiliary adjuster, such that a damping coefficient of the electromagnetic damper becomes a value suitable for damping an unsprung-resonance-frequency-range component that is a component of the relative vibration of the sprung portion and the unsprung portion in an unsprung resonance frequency range.

Since the relative vibration of the sprung portion and the unsprung portion contains a component whose frequency is higher than the sprung-resonance-frequency-range component, the direction of the relative motion of the sprung portion and the unsprung portion indicated by the value of the sprung-resonance-frequency-range component is sometimes opposite to the direction of the actual relative motion. In this instance, the generated current flows through the connection passage in which the auxiliary adjuster is disposed. Therefore, this form permits the auxiliary adjuster to have a function different from the function of the main adjuster, namely, a function of damping a component in the unsprung resonance frequency range (i.e., unsprung-resonance-frequency-range component) of the relative vibration of the sprung portion and the unsprung portion. According to this form, not only the sprung-resonance-frequency-range component, but also the unsprung-resonance-frequency-range component can be damped without changing the damping coefficients by the two adjusters. Therefore, the relative vibration of the sprung portion and the unsprung portion can be effectively damped. Here, like the above-indicated "main-adjuster control portion", the "auxiliary-adjuster control portion" may be configured such that the damping coefficient when controlling the first-connection-passage-current adjuster is a value suitable for damping the approaching motion while the damping coefficient when controlling the second-connection-passage-current adjuster is a value suitable for damping the separating motion.

(30) The damper system according to the form (29), wherein the auxiliary-adjuster control portion is configured to control the one of the first-connection-passage-current adjuster and the second-connection-passage-current adjuster that is designated as the auxiliary adjuster, such that the damping coefficient of the electromagnetic damper becomes a value suitable for damping the unsprung-resonance-frequency-range component in a situation in which an intensity of the unsprung-resonance-frequency-range component is higher than a prescribed value.

In this form, an instance in which the unsprung-resonance-frequency-range component is damped by the auxiliary adjuster is specified on the basis of the intensity of the unsprung-resonance-frequency-range component. For instance, the unsprung-resonance-frequency-range component may be damped only in a situation in which the intensity of the unsprung-resonance-frequency-range component is relatively high. The "intensity of the unsprung-resonance-frequency-range component" in this form means a degree of intensity or severity of the vibration and may be judged on the basis of various factors such as an amplitude of the unsprung-resonance-frequency-range component, and the speed or the acceleration, of the relative motion of the sprung portion and the unsprung portion with respect to the unsprung-resonance-frequency-range component. The intensity of the vibration is preferably judged on the basis of a value of each of the above-described factors within a prescribed time period between the current time point and a certain previous time point that precedes the current time point, specifically on the basis of a maximum value, an effective value or the like.

While not belonging to this form, the above-indicated main-adjuster control portion may be configured to control one of the first-connection-passage-current adjuster and the second-connection-passage-current adjuster that is designated as the main adjuster, such that the damping coefficient of the electromagnetic damper becomes a value suitable for damping the unsprung-resonance-frequency-range component in a situation in which the intensity of the unsprung-resonance-frequency-range component is higher than a prescribed value. In this arrangement, both of the current adjusters are controlled to damp the unsprung-resonance-frequency-range component. Accordingly, the unsprung-resonance-frequency-range component whose intensity is high is effectively damped, thereby improving the ride comfort of the vehicle.

(31) The damper system according to the form (29) or (30), wherein the auxiliary-adjuster control portion is configured to control the one of the first-connection-passage-current adjuster and the second-connection-passage-current adjuster that is designated as the auxiliary adjuster, such that the damping coefficient of the electromagnetic damper becomes a value suitable for damping the sprung-resonance-frequency-range component in a situation in which an intensity of the sprung-resonance-frequency-range component is higher than a prescribed value.

In this form, both of the current adjusters are controlled to damp the sprung-resonance-frequency-range component. Accordingly, the sprung-resonance-frequency-range component whose intensity is high is effectively damped, thereby improving the operating stability of the vehicle. In a combination of this form and the above-described form wherein the auxiliary adjuster is controlled such that the damping coefficient becomes a value suitable for damping the unsprung-resonance-frequency-range component in a situation in which the intensity of the unsprung-resonance-frequency-range component is higher than a prescribed value, either one of the sprung-resonance-frequency-range component and the unsprung-resonance-frequency-range component may be damped with a higher priority than the other, in a situation in which both of the intensity of the sprung-resonance-frequency-range component and the intensity of the unsprung-resonance-frequency-range component are higher than the respective prescribed values. More specifically, the sprung-resonance-frequency-range component may be damped preferentially when the operating stability is emphasized while the unsprung-resonance-frequency-range component may be damped preferentially when the ride comfort of the vehicle is emphasized.

(32) The damper system according to any one of the forms (29)-(31), wherein the auxiliary-adjuster control portion is configured to control the one of the first-connection-passage-current adjuster and the second-connection-passage-current adjuster that is designated as the auxiliary adjuster, such that the damping coefficient of the electromagnetic damper becomes a value suitable for damping a component in a frequency range between the sprung resonance frequency range and the unsprung resonance frequency range, in a situation in which an intensity of the sprung-resonance-frequency-range component is lower than a prescribed value and an intensity of the unsprung-resonance-frequency-range component is lower than a prescribed value.

In general, when the damping coefficient is made large for the purpose of damping the sprung-resonance-frequency-range component and the unsprung-resonance-frequency-range component, the intensity of the vibration is undesirably increased with respect to a component in a frequency range between the sprung resonance frequency range and the unsprung resonance frequency range. According to this form, since the component of the frequency range between the two frequency ranges is damped in a situation in which both of the intensity of the sprung-resonance-frequency-range component and the intensity of the unsprung-resonance-frequency-range component are lower than the respective prescribed values, the relative vibration of the sprung portion and the unsprung portion can be effectively damped. While not belonging to this form, the above-described main-adjuster control portion may be configured to control one of the first-connection-passage-current adjuster and the second-connection-passage-current adjuster that is designated as the main adjuster, such that the damping coefficient of the electromagnetic damper becomes a value suitable for damping the component in the frequency range between the sprung resonance frequency range and the unsprung resonance frequency range, in a situation in which the intensity of the sprung-resonance-frequency-range component is lower than the prescribed value and the intensity of the unsprung-resonance-frequency-range component is lower than the prescribed value.

(33) The damper system according to any one of the forms (27)-(32), wherein the auxiliary-adjuster control portion is configured to control the one of the first-connection-passage-current adjuster and the second-connection-passage-current adjuster that is designated as the auxiliary adjuster, such that the generated current does not flow through a corresponding one of the first connection passage and the second connection passage, in a situation in which a temperature of the electromagnetic motor is higher than a threshold temperature.

In this form, in a case where the temperature of the electromagnetic motor becomes comparatively high, the generated current is not generated when the direction of the actual relative motion of the sprung portion and the unsprung portion is opposite to the direction of the relative motion indicated by the value of the sprung-resonance-frequency-range component. Accordingly, the load on the electromagnetic motor is reduced and the heat generation of the motor is accordingly suppressed while the relative vibration of the sprung portion and the unsprung portion is damped by the main adjuster. Where each current adjuster is constituted by the above-indicated switching element, this form is realized by controlling the duty ratio of the switching element to be 0. In this regard, where the main adjuster is controlled, in addition to the auxiliary adjuster, such that the generated current does not flow through one of the first and second connection passages in which the main adjuster is disposed, the load on the electromagnetic motor is eliminated and the electromagnetic motor can be prevented from suffering from a failure or the like with high reliability.

(34) The damper system according to any one of the forms (21)-(33), wherein the external circuit includes:
a first-adjuster bypass passage which bypasses the first-connection-passage-current adjuster and in which an electric current is allowed to flow from a side of the first terminal to a side of the second terminal where the electromotive force of the electromagnetic motor caused by the motion of the sprung portion and the unsprung portion toward each other exceeds a prescribed voltage; and
a second-adjuster bypass passage which bypasses the second-connection-passage-current adjuster and in which an electric current is allowed to flow from a side of the second terminal to a side of the first terminal where the electromotive force of the electromagnetic motor caused by the motion of the sprung portion and the unsprung portion away from each other exceeds a prescribed voltage.

In this form, where the electromotive force of the electromagnetic motor exceeds the respective prescribed voltages, in other words, where the stroke speed is high, there is generated a damping force in accordance with a certain set damping coefficient irrespective of the current adjusters. According to this form, it is possible to generate a stable damping force in a situation in which the vehicle stability is needed because of the high stroked speed. Further, according to this form, even where there occurs a failure in which the electric current does not pass through any of the current adjusters, it is possible to generate a damping force where the electromotive force of the electromagnetic motor exceeds the prescribed voltages, namely, where the stroke speed is high. Therefore, this form realizes the damper system excellent in terms of failsafe operation. Each of the first-adjuster bypass passage and the second-adjuster bypass passage may be constituted by including a Zener diode.

MODE FOR CARRYING OUT THE INVENTION

There will be explained in detail one embodiment of the claimable invention with reference to the drawings. It is to be understood, however, that the claimable invention is not limited to the following embodiment but may be embodied with various changes and modifications, such as those described in the FORMS OF THE INVENTION, which may occur to those skilled in the art. It is to be further understood that modified arrangements of the following embodiment may be formed utilizing the technical matters described in the FORMS OF THE INVENTION.

<Configuration of Damper System>

Figure 1:
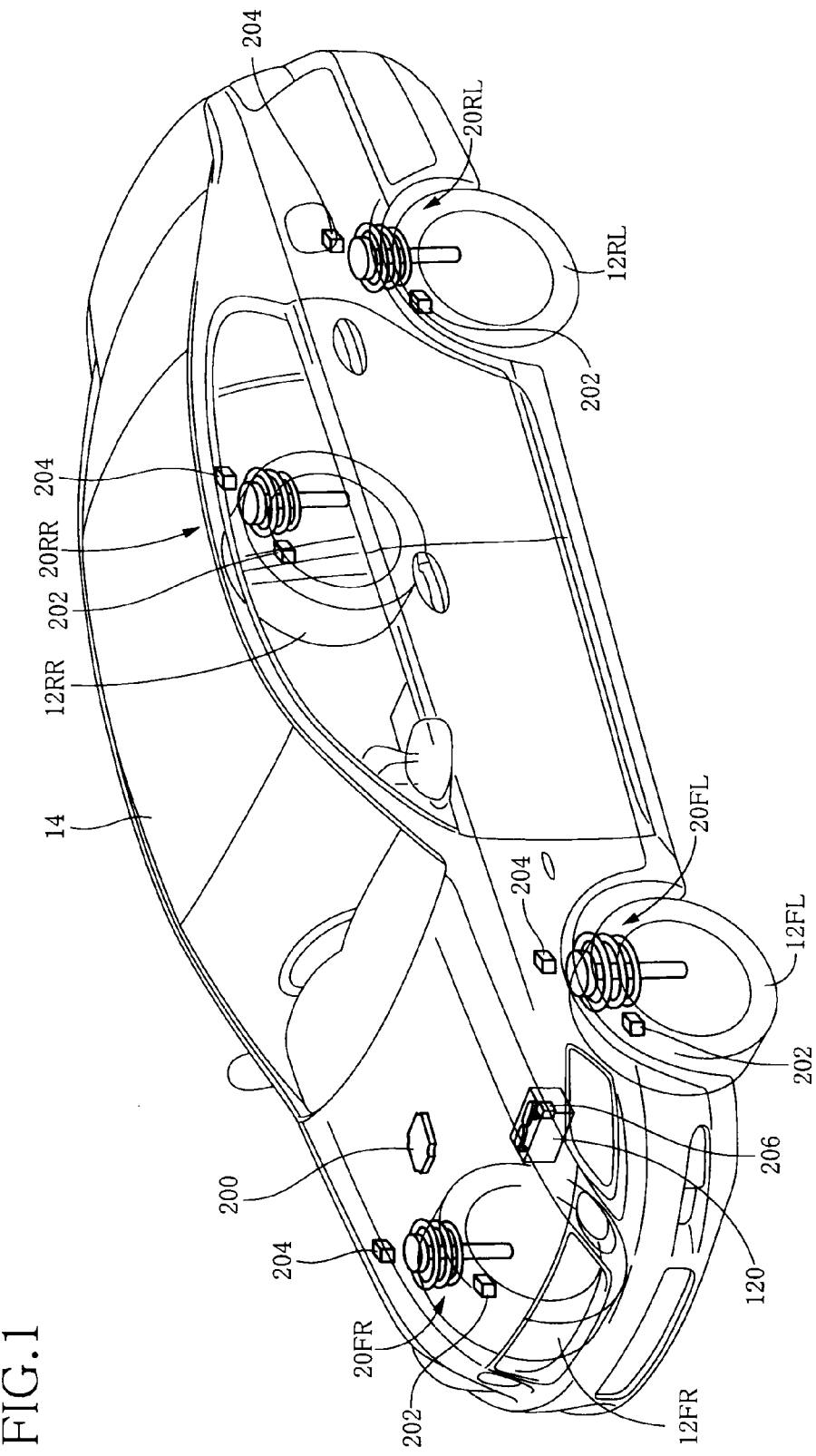
FIG. 1 is a schematic view illustrating an overall structure of a vehicle on which is mounted a damper system including an electromagnetic damper according to one embodiment of the claimable invention.

FIG. 1 schematically shows a vehicle on which is mounted a damper system including an electromagnetic damper 10 according to one embodiment of the claimable invention. The damper system is one constituent element of a suspension system mounted on the vehicle. The suspension system includes, between a body 14 of the vehicle and four wheels 12FR, FL, RR, RL, four independent suspension apparatus corresponding to the respective four wheels 12. Each suspension apparatus includes a spring•absorber Assy 20 in which a suspension spring and a shock absorber are united. Each of the four wheels 12 and each of the four spring•absorber Assys 20 are collectively referred to as the wheel 12 and the spring•absorber Assy 20, respectively. Where it is necessary to distinguish the four wheels 12 from each other and to distinguish the four spring•absorber Assys 20 from each other, there are attached, to each reference numeral, a suitable one of suffixes "FL", "FR", "RL", and "RR" respectively indicating a front left wheel, a front right wheel, a rear left wheel, and a rear right wheel.

Figure 2:
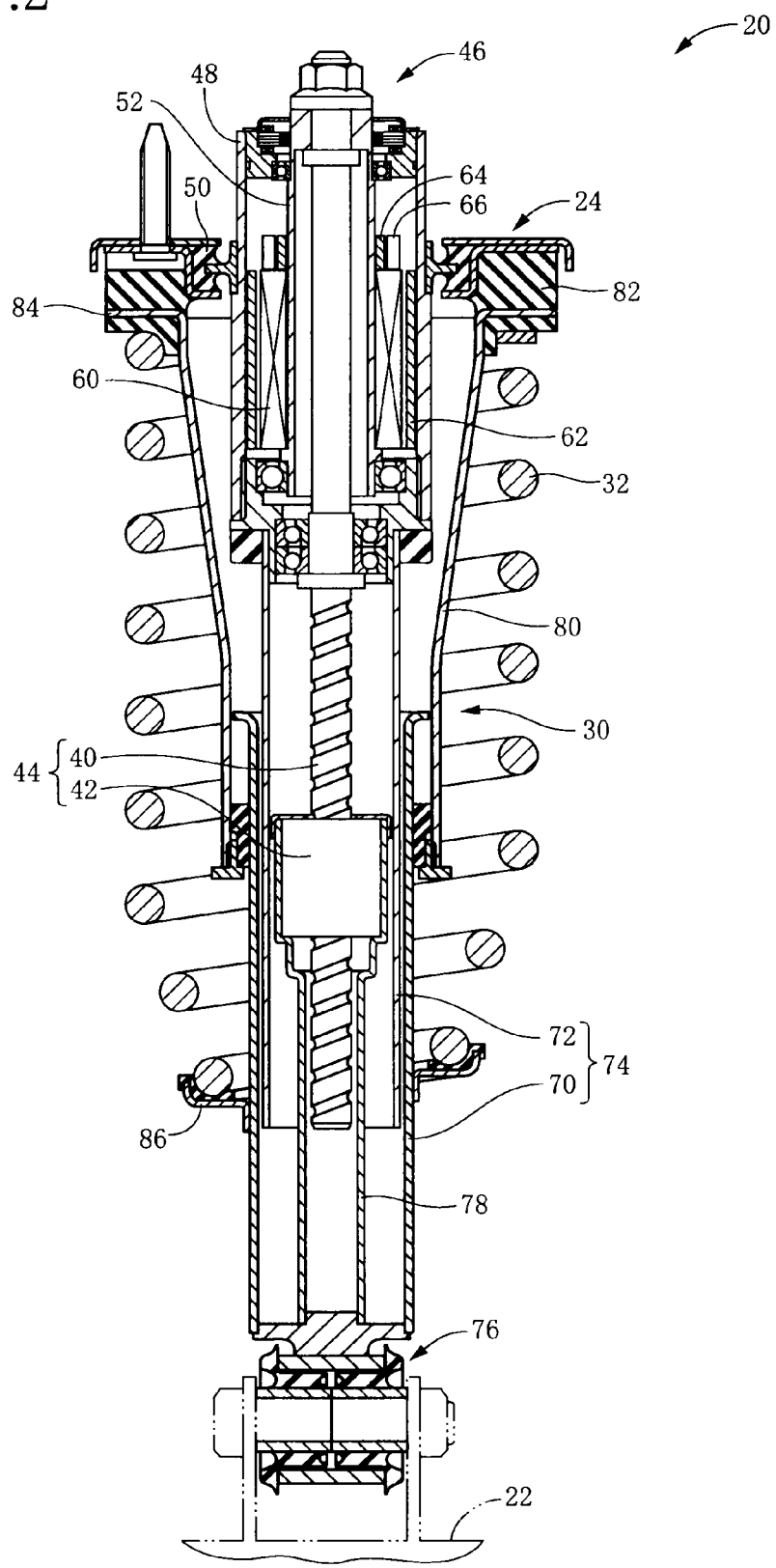
FIG. 2 is a front elevational view in cross section illustrating a spring•absorber Assy including a damper main body of the electromagnetic damper shown in FIG. 1.

As shown in FIG. 2, the spring•absorber Assy 20 is disposed between: a suspension lower arm 22 which holds the wheel 12 and which partially constitutes an unsprung portion; and a mount portion 24 which is disposed on the vehicle body 14 and which partially constitutes a sprung portion, such that the spring•absorber Assy 20 connects the suspension lower arm 22 and the mount portion 24. The spring•absorber Assy 20 is constituted by an electromagnetic shock absorber 30 as a damper main body of the electromagnetic damper 10 and a coil spring 32 as the suspension spring disposed in parallel with the shock absorber 30. The shock absorber 30 and the coil spring are united.

i) Configuration of Damper Main Body

The shock absorber 30 includes a ball screw mechanism 44 as a motion converting mechanism, an electromagnetic motor 46 of a rotary type (hereinafter simply referred to as "motor 46" where appropriate), and a casing 48 which accommodates the motor 46. The ball screw mechanism 44 includes a threaded rod 40 in which a thread groove is formed and a nut 42 which holds bearing balls and which is screwed with the threaded rod 40. The casing 48 rotatably holds the threaded rod 40 and is connected at its outer circumferential portion to the mount portion 24 via a vibration-damping rubber 50.

The motor 46 has a motor shaft 52. A plurality of polar bodies 60 are fixedly disposed on an outer circumferential portion of the motor shaft 52 in the circumferential direction. Each polar body 60 is formed by a core and a coil wound around the core. The plurality of polar bodies 60 constitute a rotor of the motor 46. A pair of permanent magnets 62 each having the magnetic poles, i.e., the N-pole and the S-pole, are fixedly disposed on an inner surface of the casing 48 so as to be opposed to the plurality of polar bodies 60. The permanent magnets 62 and the casing 48 constitute a stator of the motor 46. The motor 46 has a plurality of commutators 64 fixed to the motor shaft 52 and brushes 66 fixed to the casing 48 so as to be in sliding contact with the commutators 64. The motor 46 is a so-called brushed DC motor. The motor shaft 52 is connected integrally to an upper end portion of the threaded rod 40.

The shock absorber 30 includes a cylinder 74 constituted by an outer tube 70 and an inner tube 72 which is fitted into the outer tube 70 and which protrudes upwardly from an upper end portion of the outer tube 70. The outer tube 70 is connected to the lower arm 22 via a connecting bushing 76 provided at its lower end while the inner tube 72 is fixed at its upper end to the casing 48 with the threaded rod 40 inserted therethrough. At an inner bottom portion of the inner tube 72, a nut support pipe member 78 is disposed so as to extend upright. Inside of an upper end portion of the nut support pipe member 78, the nut 42 is fixed so as to be screwed with the threaded rod 40.

The shock absorber 30 further includes a cover tube 80 which is fixed at its upper end portion to an underside of the mount portion 24 via a vibration-damping rubber 82, such that the cylinder 74 is inserted through the cover tube 80. A flange portion 84 functioning as an upper retainer is formed at the upper end portion of the cover tube 80. The coil spring 32 as the suspension spring is supported or held so as to be sandwiched between the flange portion 84 and an annular lower retainer 86 provided on an outer circumferential surface of the outer tube 70.

In the thus constructed shock absorber 30, the threaded rod 40 and the nut 42 are movable relative to each other in the axial direction when the sprung portion and the unsprung portion are moved toward and away from each other, and the threaded rod 40 rotates relative to the nut 42 by the relative movement of the threaded rod 40 and the nut 42, whereby the motor shaft 52 also rotates. As explained below in detail, the electromagnetic damper 10 also includes an external circuit 90 (FIG. 3) provided outside the motor 46 and is constructed such that two terminals of the motor 46 are electrically connected by the external circuit 90. That is, the motor 46 is rotated by an external force, so that an electromotive force is generated in the motor 46 and the motor 46 generates a motor force (torque) that depends on the electromotive force. The motor 46 is capable of giving, to the threaded rod 40, the torque that depends on the electromotive force. Owing to the torque, it is possible to generate, with respect to the relative rotation of the threaded rod 40 and the nut 42, a resistance force in a direction to prevent the relative rotation. In other words, the electromagnetic damper 10 is configured to permit the resistance force to act as a damping force with respect to the motion of the sprung portion and the unsprung portion toward each other (i.e., approaching motion) and the motion thereof away from each other (i.e., separating motion).

ii) Configuration of External Circuit

Figure 3:
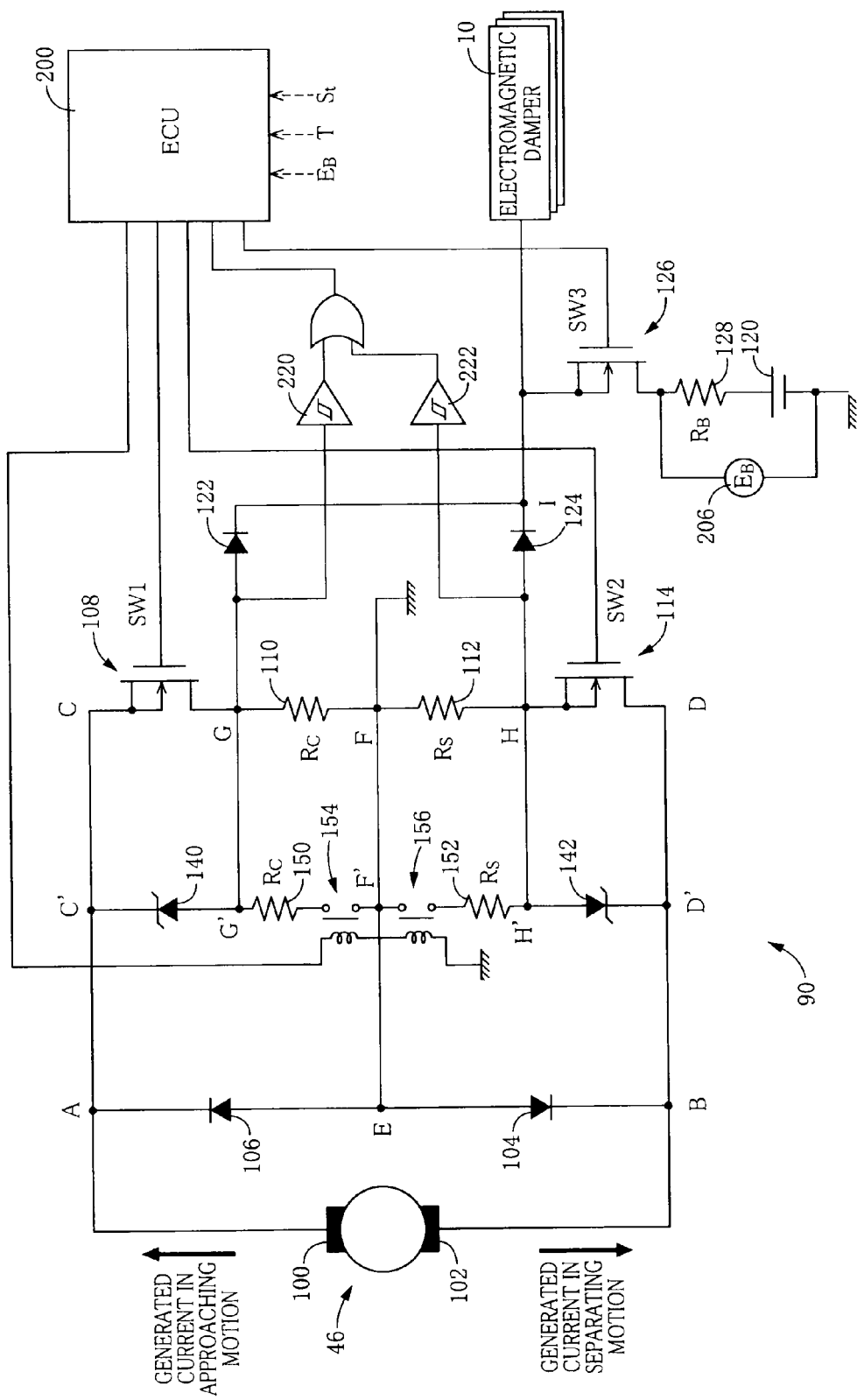
FIG. 3 is a circuit diagram of an external circuit which is one constituent element of the electromagnetic damper shown in FIG. 1 and which is provided outside an electromagnetic motor of FIG. 2.

FIG. 3 shows a circuit diagram of the external circuit 90 that constitutes the electromagnetic damper 10. The external circuit 90 permits an electric current to flow between a first terminal 100 and a second terminal 102 of the motor 46. In the external circuit 90, a point A on the first terminal side (100) and a point B on the second terminal side (102) are connected by a line AB while a point C on the first terminal side (100) and a point D on the second terminal side (102) are connected by a line CD. In the line AB, there are provided: a first diode 104 which allows an electric current to flow in a direction from the point A to the point B and which prohibits an electric current from flowing from the point B to the point A; and a second diode 106 which allows the electric current to flow from the point B to the point A and which prohibits the electric current from flowing from the point A to the point B. In the line CD, there are provided, in a direction from the point C to the point D, a first switching element [SW1] 108 which is a MOS-type FET, a first resistor [$R_C$] 110 which is a fixed resistor, a second resistor [$R_S$] 112 which is a fixed resistor, and a second switching element [SW2] 114 which is a MOS-type FET. A point E between the first diode 104 and the second diode 106 in the line AB and a point F between the first resistor 110 and the second resistor 112 in the line CD are electrically connected by a line EF and are grounded.

A point G between the first switching element 108 and the first resistor 110 in the line CD and a point H between the second resistor 112 and the second switching element 114 in the line CD are connected to a high-potential-side terminal of a battery 120 (with a nominal voltage $E_N$: 12.0 V) as a battery device installed on the vehicle. More specifically, in a line GI which connects the point G and a point I on the side of the high-potential-side terminal of the battery 120, there is provided a third diode 122 which allows the electric current to flow from the point G to the point I and which prohibits the electric current from flowing from the point I to the point G. In a line HI which connects the point H and the point I on the side of the high-potential-side terminal of the battery 120, there is provided a fourth diode 124 which allows the electric current to flow from the point H to the point I and which prohibits the electric current from flowing from the point I to the point H. A third switching element [SW3] 126 which is a MOS-type FET is provided on the side of the high-potential-side terminal of the battery 120, more specifically, between the point I and the high-potential-side terminal of the battery 120. A low-potential-side terminal of the battery 120 is grounded. A resistance 128 on the side of the high-potential-side terminal of the battery 120 shown in FIG. 3 indicates an internal resistance of the battery 120 and is referred to as a source resistance [$R_B$] 128 in the following explanation.

The external circuit 90 further includes a first Zener diode 140 disposed in parallel with the first switching element 108 and a second Zener diode 142 disposed in parallel with the second switching element 114. The first Zener diode 140 allows the electric current to flow from a point G' to a point C' while prohibits the electric current from flowing from the point C' to the point G'. The first Zener diode 140 also allows the electric current to flow from the point C' to the point G' where a voltage applied thereto exceeds its breakdown voltage. The second Zener diode 142 is similar in construction to the first Zener diode 140. More specifically, the second Zener diode 142 allows the electric current to flow from a point H' to a point D' while prohibits the electric current from flowing from the point D' to the point H'. The second Zener diode 142 also allows the electric current to flow from the point D' to the point H' where a voltage applied thereto exceeds its breakdown voltage.

The external circuit 90 further includes a first auxiliary resistor 150 which is disposed in parallel with the first resistor 110 and which is a fixed resistor and a second auxiliary resistor 152 which is disposed in parallel with the second resistor 112 and which is a fixed resistor. In a line G'F' in which the first auxiliary resistor 150 is provided, there is provided a first relay 154 configured to place the line G'F' selectively in a state in which the electric current flows therethrough and in a state in which the electric current does not flow therethrough. In a line H'F' in which the second auxiliary resistor 152 is provided, there is provided a second relay 156 configured to place the line H'F' selectively in a state in which the electric current flows therethrough and in a state in which the electric currenrt does not flow therethrough. Each of the first relay 154 and the second relay 156 is configured to place the corresponding line in the state in which the electric current flows therethrough (OFF state) when its electromagnetic coil is energized and in the state in which the electric current does not flow therethrough (ON state) when not energized.

iii) Basic Functions of External Circuit

Figure 4:
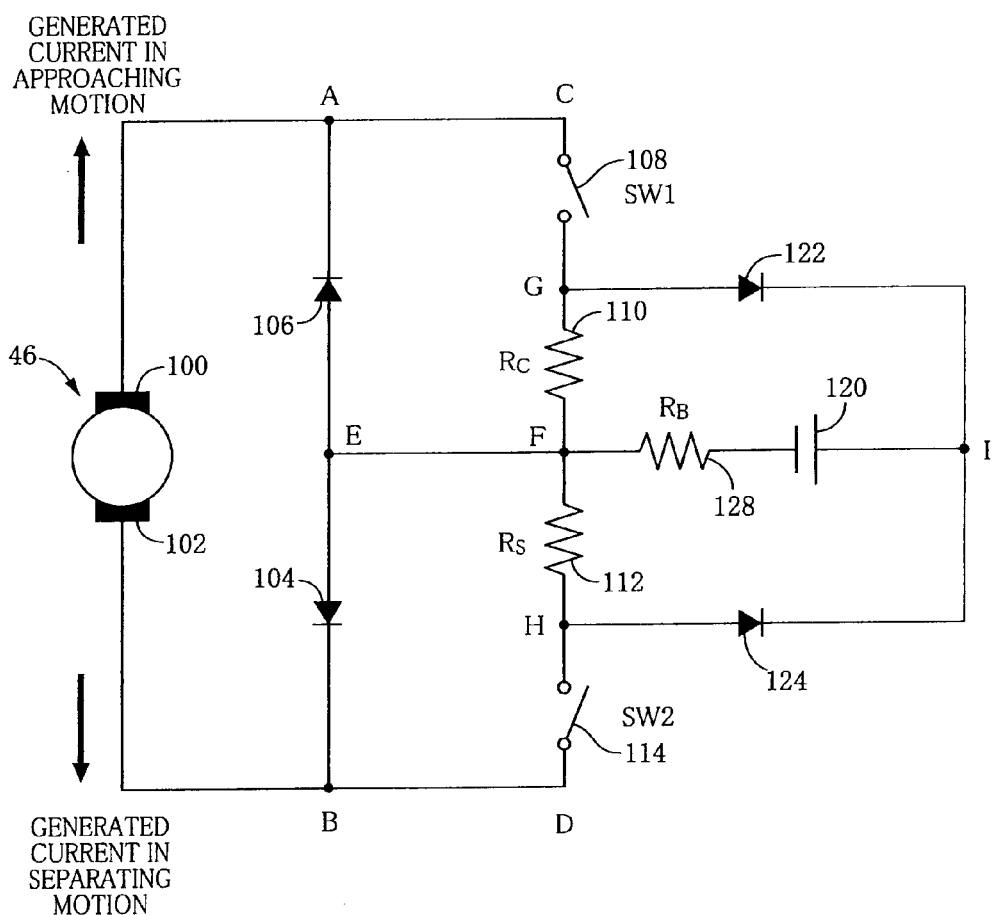
FIG. 4 is an equivalent circuit diagram of the external circuit shown in FIG. 3.

While the electromagnetic damper 10 corresponding to one of the four wheels 12 has been explained above, each of other electromagnetic dampers 10 respectively corresponding to the other three wheels 12 is similarly constructed and connected to the battery 120 as shown in FIG. 3. Hereinafter, there will be explained in detail basic functions of the electromagnetic dampers 10 with reference to FIG. 4. FIG. 4 shows an equivalent circuit diagram in which only constituent elements of the external circuit 90 necessary for explanation are shown and the structure of the external circuit 90 is accordingly simplified.

In the motor 46, the first terminal 100 is at a high potential and the second terminal 102 is at a low potential in the approaching motion of the sprung portion and the unsprung portion toward each other while the first terminal 100 is at a low potential and the second terminal 102 is at a high potential in the separating motion of the sprung portion and the unsprung portion away from each other. Accordingly, a generated current of the motor 46 flows from the first terminal 100 to the second terminal 102 via the points C, F, E, and B in the approaching motion. On the other hand, the generated current of the motor 46 flows from the second terminal 102 to the first terminal 100 via the points D, F, E, and A in the separating motion. That is, the first diode 104 functions as a first rectifier which allows the electric current to flow from the first terminal 100 to the second terminal 102 of the motor 46 while prohibits the electric current from flowing from the second terminal 102 to the first terminal 100, and the passage CFEB in the external circuit 90 functions as a first connection passage. Further, the second diode 106 functions as a second rectifier which allows the electric current to flow from the second terminal 102 to the first terminal 100 of the motor 46 while prohibits the electric current from flowing from the first terminal 100 to the second terminal 102, and the passage DFEA functions as a second connection passage. In the electromagnetic damper 10, therefore, the passage through which the generated current of the motor 46 flows in the approaching motion and the passage through which the generated current of the motor 46 flows in the separating motion are mutually different. Accordingly, the damping characteristic with respect to the approaching motion and the damping characteristic with respect to the separating motion can be easily made different from each other, ensuring various advantages that will be explained in detail.

The first resistor 110 provided in the first connection passage CFEB functions as a resistance to the electric current that flows from the first terminal to the second terminal, and the first switching element 108 functions as a first-connection-passage-current adjuster configured to adjust the electric current that flows from the first terminal to the second terminal. The second resistor 112 provided in the second connection passage DFEA functions as a resistance to the electric current that flows from the second terminal to the first terminal, and the second switching element 114 functions as a second-connection-passage-current adjuster configured to adjust the electric current that flows from the second terminal to the first terminal. The resistance value $R_C$ of the first resistor 110 is made larger than the resistance value $R_S$ of the second resistor 112 (e.g., $R_C=2\times R_S$). Accordingly, a damper system is realized in which a damping force with respect to the approaching motion of the sprung portion and the unsprung portion toward each other is made smaller than a damping force with respect to the separating motion thereof away from each other in a state in which the electric current is allowed to flow between the point C and the point F and between the point D and the point F respectively by the first and second switching elements 108, 114, for instance. As will be explained below, the present damper system is configured to change the damping characteristic with respect to a relative motion of the sprung portion and the unsprung portion by controlling the first switching element 108 and the second switching element 114, under normal conditions. Further, even where there occurs a failure in which an appropriate damping characteristic cannot be attained, for instance, it is possible to mitigate a shock or impact applied to the vehicle body 14 in an instance where the wheel 12 moves toward or approaches the vehicle body 14 when the wheel 12 passes on a bump or projection on the road surface, by establishing the above-indicted state in which the electric current is allowed to flow between CF and between DF respectively by the first and second switching elements 108, 114. Accordingly, the present damper system is configured to suppress deterioration of the vehicle ride comfort at the time of occurrence of the above-indicated failure.

Since the motor 46 is connected to the battery 120 as described above, a part of the electric power generated by the motor 46 is regenerated into the battery 120 when the electromotive force of the motor 46 exceeds the voltage of the battery 120. More specifically, when the sprung portion and the unsprung portion move toward each other, the generated current of the motor 46 not only flows through the above-indicated first connection passage CFEB, but also flows from the first terminal 100 to the high-potential-side terminal of the battery 120 via the line GI and flows from the low-potential-side terminal of the battery 120 to the second terminal 102. On the other hand, when the sprung portion and the unsprung portion move away from each other, the generated current of the motor 46 not only flows through the second connection passage DFEA, but also flows from the second terminal 102 to the high-potential-side terminal of the battery 120 via the line HI and flows from the low-potential-side terminal of the battery 120 to the first terminal 102. That is, a passage CGI in the external circuit 90 functions as a first high-potential-side connection passage in which the electric current is allowed to flow from the first terminal 100 to the high-potential-side terminal of the battery 120 while the electric current is prohibited from flowing from the high-potential-side terminal to the first terminal 100. A passage FEB functions as a first low-potential-side connection passage in which the electric current is allowed to flow from the low-potential-side terminal of the battery 120 to the second terminal 102 while the electric current is prohibited from flowing from the second terminal 102 to the low-potential-side terminal. A passage DHI functions as a second high-potential-side connection passage in which the electric current is allowed to flow from the second terminal 102 to the high-potential-side terminal of the battery 120 while the electric current is prohibited from flowing from the high-potential-side terminal to the second terminal 102. A passage FEA functions as a second low-potential-side connection passage in which the electric current is allowed to flow from the low-potential-side terminal of the battery 120 to the first terminal 100 while the electric current is prohibited from flowing from the first terminal 100 to the low-potential-side terminal. Accordingly, the external circuit 90 includes a battery-device connection passage which includes the first high-potential-side connection passage, the first low-potential-side connection passage, the second high-potential-side connection passage, and the second low-potential-side connection passage and in which the electric current is allowed to flow from one of the two terminals 100, 102 of the motor 46 that is at a high potential to the high-potential-side terminal of the battery 120 and the electric current is allowed to flow from the low-potential-side terminal of the battery 120 to the other of the two terminals 100, 102 of the motor 46 that is at a low potential. The above-indicated third switching element 126 is configured to adjust the electric current which flows through the battery-device connection passage and functions as a battery-device-connection-passage-current adjuster.

iv) External-Circuit Controller

In the damper system 10, the external circuit 90 is controlled by an electronic control unit 200 (hereinafter referred to as "ECU 200" where appropriate) as an external-circuit controller, whereby the flow of the generated current by the motor 46 is controlled. More specifically, there are connected, to the ECU 200, the first switching element 108, the second switching element 114, the third switching element 126, the first relay 154, and the second relay 156 which are controlled by the ECU 200. The vehicle is equipped with four stoke sensors [St] 202 each for detecting a distance between the sprung portion and the unsprung portion for a corresponding one of the wheels 12, temperature sensors [T] 204 each for detecting the temperature of a corresponding one of the motors 46 of the respective four electromagnetic dampers 10, a voltage sensor [$E_B$] 206 for measuring the voltage of the battery 120, and so on. These sensors are connected to the ECU 200. The ECU 200 is configured to control the external circuit 90 on the basis of signals from the respective sensors. The characters in the above-indicated square brackets [ ] are signs when the sensors and the like are indicated in the drawings. The above-indicated distance between the sprung portion and the unsprung portion may be referred to as a "stroke" where appropriate because the distance represents an amount of expansion and contraction of the shock absorber 30. In a ROM of the computer of the suspension ECU 200, there are stored a program relating to the control of the external circuit 90 which will be explained, various data, and so on.

<Control of Damper System>

In the damper system, the external circuits 90 of the respective four electromagnetic dampers 10 can be controlled independently of each other. In the electromagnetic dampers 10, the damping coefficients of the respective dampers 10 are controlled independently of each other, whereby the damping force with respect to the relative vibration of the sprung portion and the unsprung portion that correspond to each damper 10 is controlled. In each electromagnetic damper 10, it is possible to control a damping coefficient $C_C$ with respect to the approaching motion of the sprung portion and the unsprung portion toward each other and a damping coefficient $C_S$ with respect to the separating motion of the sprung portion and the unsprung portion away from each other, independently of each other. In the electromagnetic damper 10, in general, the generated current caused by the approaching motion flows through the first connection passage CFEB and the generated current caused by the separating motion flows through the second connection passage DFEA as explained above. Accordingly, the first switching element 108 provided in the first connection passage is controlled, so that the generated current caused by the approaching motion is controlled and the damping coefficient $C_C$ with respect to the approaching motion (hereinafter referred to as "damping coefficient $C_C$ at the time of approach" where appropriate) is thereby controlled. Further, the second switching element 114 provided in the second connection passage is controlled, so that the generated current caused by the separating motion is controlled and the damping coefficient $C_S$ with respect to the separating motion (hereinafter referred to as "damping coefficient $C_S$ at the time of separation" where appropriate) is thereby controlled.

Figure 5:
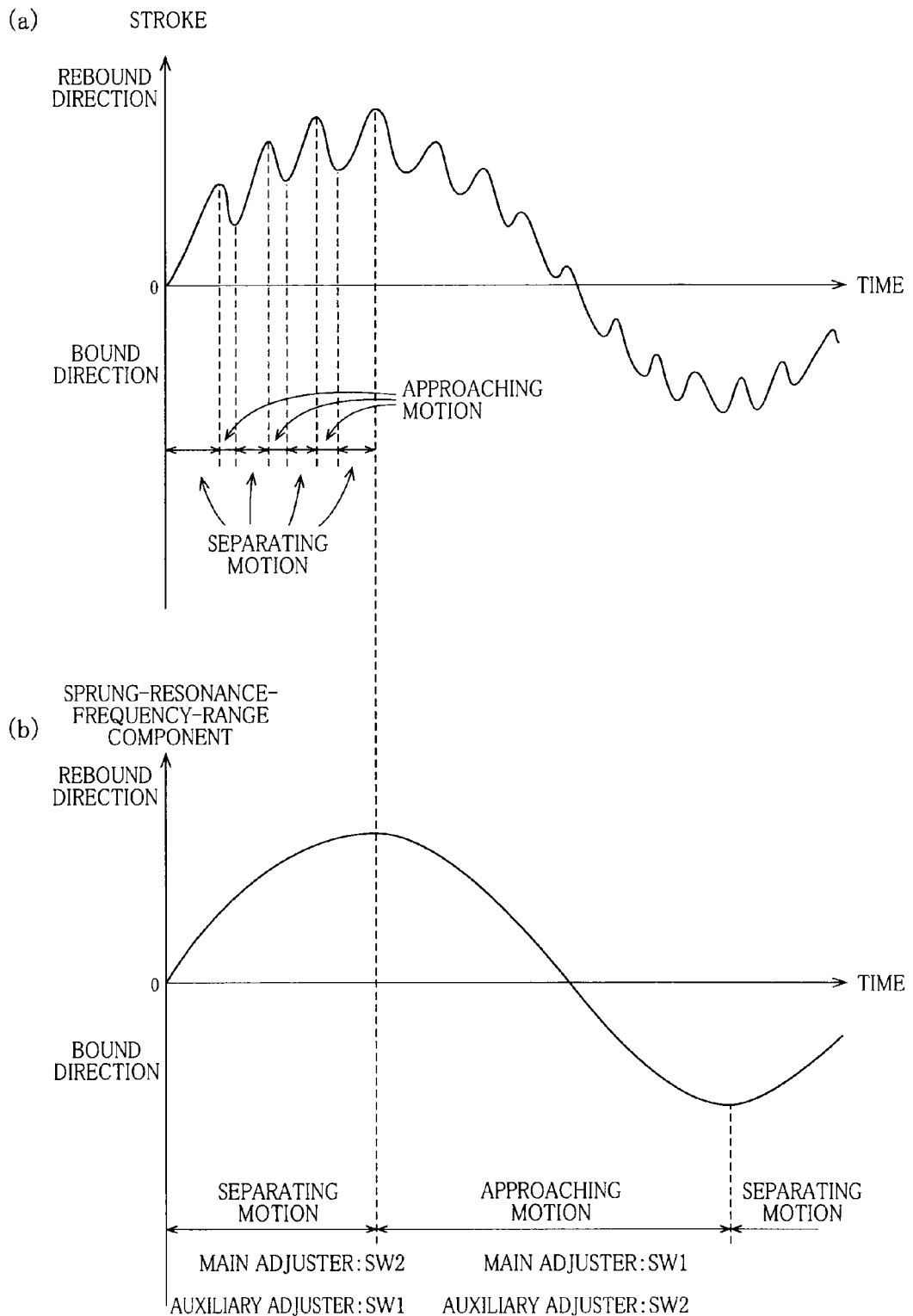
FIG. 5 is a view showing an amplitude of a relative vibration of a sprung portion and unsprung portion and is a view showing a change of its sprung-resonance-frequency-range component with a lapse of time.

Here, there is considered a damper system in which a single connection passage is provided for connecting two terminals of a motor and a single current adjuster is provided in the connection passage, for instance. In such a damper system, the generated current of the motor caused by the approaching motion and the generated current of the motor caused by the separating motion flow through the connection passage in mutually opposite directions, and the single current adjuster provided in the connection passage can adjust both of the generated currents flowing in the opposite directions. The relative vibration of the sprung portion and the unsprung portion, however, contains a component having a relatively high frequency, as shown in FIG. 5(a), and the approaching motion and the separating motion may alternate at very short intervals. In such an instance, it is difficult, in view of the responsiveness in the control of the current adjuster, to switch the damping coefficients depending upon the direction of the relative motion of the sprung portion and the unsprung portion by the single current adjuster. In contrast, in the present damper system, the generated current caused by the approaching motion and the generated current caused by the separating motion flow through the respective different passages, thereby eliminating a need of switching the controls of the switching elements 108, 114 depending upon the direction of the relative motion of the sprung portion and the unsprung portion. In the present damper system, therefore, the damping coefficient $C_C$ at the time of approach and the damping coefficient $C_S$ at the time of separation can be made appropriate by controlling the two switching elements 108, 114 in accordance with the vehicle running state and the like, so that the relative vibration of the sprung portion and the unsprung portion can be effectively damped. There will be hereinafter explained in detail a method of determining the damping coefficient $C_C$ at the time of approach and the damping coefficient $C_S$ at the time of separation.

i) Determination of Damping Coefficients a) Damping Coefficient of Main Adjuster In the present damper system, it is construed that the relative vibration of the sprung portion and the unsprung portion is composed of vibrations of various frequencies. The present damper system mainly aims at damping a component in a sprung resonance frequency range (e.g., 0.1 Hz-3.0 Hz) among various frequencies. More specifically, as shown in FIG. 5(b), the ECU 200 is configured to designate or determine, as a main adjuster, one of the two switching elements that adjusts the generated current caused by the relative motion of the sprung portion and the unsprung portion, on the basis of the direction of the relative motion indicated by a value of the component in the sprung resonance frequency range (i.e., the sprung-resonance-frequency-range component) and to control the main adjuster to damp the component.

Specifically, there is initially detected a change amount of the stroke, namely, a stroke speed Vst, on the basis of a detected value of the stroke sensor 202. Subsequently, there is performed, on the stroke speed Vst, band-pass filter processing, namely, filter processing that allows passing of only a component having a frequency higher than 0.1 Hz and lower than 3.0 Hz, so that there is obtained a sprung-resonance stroke speed Vstb which is the sprung-resonance-frequency-range component of the stroke speed Vst. The thus obtained sprung-resonance stroke speed Vstb is judged, on the basis of its sign, to be a value indicative of the approaching motion of the sprung portion and the unsprung portion or a value indicative of the separating motion thereof. Where the sprung-resonance stroke speed Vstb is negative and accordingly is the value indicative of the approaching motion, the first switching element 108 provided in the first connection passage through which the generated current caused by the approaching motion flows is designated as the main adjuster. On the other hand, where the sprung-resonance stroke speed Vstb is positive and accordingly is the value indicative of the separating motion, the second switching element 114 provided in the second connection passage through which the generated current caused by the separating motion flows is designated as the main adjuster.

The main adjuster designated as described above is controlled to establish a damping coefficient suitable for damping the sprung-resonance-frequency-range component. In the present damper system, the damping coefficient $C_C$ with respect to the approaching motion is made smaller than the damping coefficient $C_S$ with respect to the separating motion. Accordingly, the second switching element 114 designated as the main adjuster is controlled such that the damping coefficient $C_S$ at the time of separation becomes equal to $C_{S1}$ (e.g., 5000 N·sec/m which is a value that is assumed to act directly on the wheel 12 with respect to the motion thereof), and the first switching element 108 designated as the main adjuster is controlled such that the damping coefficient $C_C$ at the time of approach becomes equal to $C_{C1}$ (e.g., 2500 N·sec/m).

b) Damping Coefficient of Auxiliary Adjuster

The ECU 200 designates or determines, as an auxiliary adjuster, the other of the two switching elements which is not the main adjuster. The ECU 200 controls the auxiliary adjuster to assist the main adjuster. The auxiliary adjuster is basically controlled to establish a damping coefficient suitable for damping a component of the relative vibration of the sprung portion and the unsprung portion in an unsprung resonance frequency range (e.g., 8.0 Hz-24 Hz), so as to damp the component. Specifically, the second switching element 114 designated as the auxiliary adjuster is controlled such that the damping coefficient $C_S$ at the time of separation becomes equal to $C_{S2}$ (e.g., 3000 N·sec/m) and the first switching element 108 designated as the auxiliary adjuster is controlled such that the damping coefficient $C_C$ at the time of approach becomes equal to $C_{C2}$ (e.g., 1500 N·sec/m).

It is noted here that the ECU 200 is configured to permit the auxiliary adjuster to have not only the function of damping the unsprung-resonance-frequency-range component, but also other functions on the basis of the intensity of the sprung-resonance-frequency-range component and the intensity of the unsprung-resonance-frequency-range component. More specifically, there is initially obtained, as the intensity of the sprung-resonance-frequency-range component, a maximum value of the sprung-resonance stroke speed Vstb within a prescribed time period $t_0$ between the current time point and a certain previous time point that precedes the current time point by $t_0$. It is then judged whether or not the obtained value is larger than a set speed $Vb_0$. Where the maximum value of the sprung-resonance stroke speed Vstb is larger than the set speed $Vb_0$, the auxiliary adjuster is controlled, like the main adjuster, to establish the damping coefficient $C_{S1}$ or $C_{C1}$ for damping the sprung-resonance-frequency-range component, so as to give a higher priority to damping of the sprung-resonance-frequency-range component.

Where the maximum value of the sprung-resonance stroke speed Vstb is smaller than the set speed $Vb_0$, the intensity of the unsprung-resonance-frequency-range component is obtained. There is initially performed, on the stroke speed Vst detected on the basis of the detected value of the stroke sensor 202, band-pass filter processing, namely, filter processing that allows passing of only a component having a frequency higher than 8.0 Hz and lower than 24 Hz, so that there is obtained an unsprung-resonance stroke speed Vstw which is the unsprung-resonance-frequency-range component of the stroke speed Vst. Subsequently, there is obtained, as the intensity of the unsprung-resonance-frequency-range component, a maximum value of the unsprung-resonance stroke speed Vstw within the prescribed time period $t_0$ between the current time point and a certain previous time point that precedes the current time point by $t_0$. It is then judged whether or not the obtained value is larger than a set speed $Vw_0$. Where the maximum value of the unsprung-resonance stroke speed Vstw is larger than the set speed $Vw_0$, the auxiliary adjuster is controlled to establish the damping coefficient $C_{S2}$ or $C_{C2}$ for damping the unsprung-resonance-frequency-range component, so as to damp the component, as described above.

Where the maximum value of the sprung-resonance stroke speed Vstb is smaller than the set speed $Vb_0$ and the maximum value of the unsprung-resonance stroke speed Vstw is smaller than the set speed $Vw_0$, the auxiliary adjuster is controlled to establish a damping coefficient for damping a component having a frequency between the sprung resonance frequency range and the unsprung resonance frequency range, so as to damp the component (hereinafter referred to as "intermediate-frequency-range component" where appropriate). More specifically, the second switching element 114 designated as the auxiliary adjuster is controlled such that the damping coefficient $C_S$ at the time of separation becomes equal to $C_{S3}$ (e.g., 1000 N·sec/m), and the first switching element 108 designated as the auxiliary adjuster is controlled such that the damping coefficient $C_C$ at the time of approach becomes equal to $C_{C3}$ (e.g., 500 N·sec/m).

The thus constructed damper system permits the auxiliary adjuster to have various functions, making it possible to effectively damp not only the sprung-resonance-frequency-range component, but also the component having a higher frequency than the sprung resonance frequency range.

ii) Determination of Duty Ratio

In general, the ECU 200 controls the generated current caused by the approaching motion of the sprung portion and the unsprung portion toward each other by controlling the first switching element 108 of the external circuit 90, so as to control the damping coefficient $C_C$ at the time of approach. The ECU 200 also controls the generated current caused by the separating motion of the sprung portion and the unsprung portion away from each other by controlling the second switching element 114, so as to control the damping coefficient $C_S$ at the time of separation. The ECU 200 performs a Pulse Width Modulation (PWM) control on the switching elements 108, 114. More specifically, in the PWM control, a pulse pitch is made constant which is obtained by adding a pulse-on time $t_{ON}$ during which each of the connection passages that correspond to the respective switching elements 108, 114 is in the electrically connected state and a pulse-off time $t_{OFF}$ during which each connection passage is the electrically shut-off state, and a duty ratio $r_D$ $(=t_{ON}/t_{ON}+t_{OFF}))$ that is a ratio of the pulse-on time to the pulse pitch is controlled. That is, the ECU 200 controls the generated current by the motor 46 by controlling the duty ratio $r_D$ of each of the switching elements 108, 114, so as to control the damping coefficient C of the electromagnetic damper 10.

There will be next explained a relationship between the duty ratio $r_D$ of each of the switching elements 108, 114 and the damping coefficient C of the electromagnetic damper 10. The motor 46 of the electromagnetic damper 10 is the brushed DC motor as described above. Where the electric current that flows in the motor 46 is I, the torque to be generated is Tq, the rotational speed is w, and the voltage generated between the two terminals 100, 102 is E, the following relationships are established:

$$E=\alpha\cdot\omega \quad (1)$$

$$Tq=\alpha\cdot I \quad (2)$$

Here, "α" is a motor constant (a torque constant, a conter-electromotive-force constant) of the motor 46.

Initially, a situation is considered in which the motor 46 is rotated in a state wherein each of the connection passages that correspond to the respective switching elements 108, 114 is in the electrically connected state, namely, wherein the duty ratio $r_D$ is 1.0 and in which the electromotive force E of the motor 46 is not larger than the nominal voltage $E_N$ of the battery 120. In this situation, the generated current of the motor 46 flows through the first connection passage CFEB in the approaching motion while flows through the second connection passage DFEA in the separating motion, and the amounts of the generated current are determined by the following formulas:

$$\text{Approaching motion: } I=E/R_C \quad (3)$$

$$\text{Separating motion: } I=E/R_S \quad (4)$$

Here, in an instance where the switching elements 108, 114 are controlled under the duty ratio $r_D$, the amounts of the generated current in that instance are as follows:

$$\text{Approaching motion: } I=r_D\cdot E/R_C \quad (3')$$

$$\text{Separating motion: } I=r_D\cdot E/R_S \quad (4')$$

The above-indicated formula (1) is substituted into the formulas (3') and (4'), and "I" obtained by the substitution is substituted into the above-indicated formula (2), so that the following formulas are obtained:

$$\text{Approaching motion: } Tq=r_D\cdot\alpha^2/R_C\cdot\omega \quad (5)$$

$$\text{Separating motion: } Tq=r_D\cdot\alpha^2/R_S\cdot\omega \quad (6)$$

The damping coefficient C of the electromagnetic damper 10 is represented by a magnitude F of the damping force with respect to the speed Vst of the relative motion of the sprung portion and the unsprung portion, in other words, represented by the torque Tq of the motor 46 with respect to the rotational speed ω of the motor 46. That is, the damping coefficient $C_C$ with respect to the approaching motion and the damping coefficient $C_S$ with respect to the separating motion are indicated as follows:

$$C_C = r_D \cdot \alpha^2 / R_C \quad (7)$$

$$C_S = r_D \cdot \alpha^2 / R_S \quad (8)$$

Next, a situation is considered in which the electromotive force E of the motor 46 exceeds the nominal voltage $E_N$ of the battery 120. In this situation, the generated current of the motor 46 flows through the first connection passage and the battery-device connection passage in the approaching motion while flows through the second connection passage and the battery-device connection passage in the separating motion, and the magnitude of the generated current is determined by the following formulas:

Approaching motion: $I =$ (9)
$$E/R_C + (E - E_N)/R_B = (1/R_C + 1/R_B) \cdot E - E_N/R_B$$

Separating motion: $I =$ (10)
$$E/R_S + (E - E_N)/R_B = (1/R_S + 1/R_B) \cdot E - E_N/R_B$$

Here, in an instance where the switching elements 108, 114 are controlled under the duty ratio $r_D$, the amount of the generated current in that instance is as follows:

Approaching motion: $I = r_D \cdot [(1/R_C + 1/R_B) \cdot E - E_N/R_S]$ (9')

Separating motion: $I = r_D \cdot [(1/R_S + 1/R_S) \cdot E - E_N/R_B]$ (10')

The above-indicated formula (1) is substituted into the formulas (9') and (10'), and "I" obtained by the substitution is substituted into the above-indicated formula (2), so that the following formulas are obtained:

Approaching motion: $Tq = r_D \cdot [\alpha^2 \cdot (1/R_C + 1/R_B) - \alpha \cdot E_N / (R_B \cdot \omega)] \cdot \omega$ (11)

Separating motion: $Tq = r_D \cdot [\alpha^2 \cdot (1/R_S + 1/R_B) - \alpha \cdot E_N / (R_B \cdot \omega)] \cdot \omega$ (12)

Accordingly, the damping coefficient $C_C$ with respect to the approaching motion and the damping coefficient $C_S$ with respect to the separating motion are indicated as follows:

$$C_C = r_D \cdot [\alpha^2 \cdot (1/R_C + 1/R_B) - \alpha \cdot E_N/(R_B \cdot \omega)] \quad (13)$$

$$C_S = r_D \cdot [\alpha^2 \cdot (1/R_S + 1/R_B) - \alpha \cdot E_N/(R_B \cdot \omega)] \quad (14)$$

Accordingly, the ECU 200 controls the damping coefficient $C_C$ at the time of approach by controlling a duty ratio $r_{DSW1}$ of the first switching element 108 while controls the damping coefficient $C_S$ at the time of separation by controlling a duty ratio $r_{DSW2}$ of the second switching element 114. More specifically, the damping coefficients each as a target are determined according to the manner described above, and the duty ratio $r_D$ as a target is determined according to the following formulas so as to establish the target damping coefficients:

$$r_{DSW1} = C_C * /(\alpha^2/R_C) \quad (E \leq E_N)$$
$$= C_C * /[\alpha^2 \cdot (1/R_C + 1/R_B) - \alpha \cdot E_N(R_B \cdot V_{st})] \quad (E > E_N)$$

$$r_{DSW2} = C_S * /(\alpha^2/R_S) \quad (E \leq E_N)$$
$$= C_S * /[\alpha^2 \cdot (1/R_S + 1/R_B) - \alpha \cdot E_N(R_B \cdot V_{st})] \quad (E > E_N)$$

The switching elements 108, 114 are controlled to be opened and closed under the respective duty ratios determined as described above, so that the damping coefficient of the electromagnetic damper 10 is changed. Whether or not the electromotive force E is higher than the nominal voltage $E_N$ of the battery 120 is judged on the basis of the stroke speed Vst that is proportional to the rotational speed ω of the motor 46, according to the relationship of the formula (1). That is, the judgment is made depending upon whether the stroke speed Vst is larger than a value $V_0$ ($=K \cdot E_N/\alpha$, K: a constant between motor rotational speed ω and stroke speed Vst) that corresponds to the nominal voltage $E_N$ of the battery 120.

Figure 6:
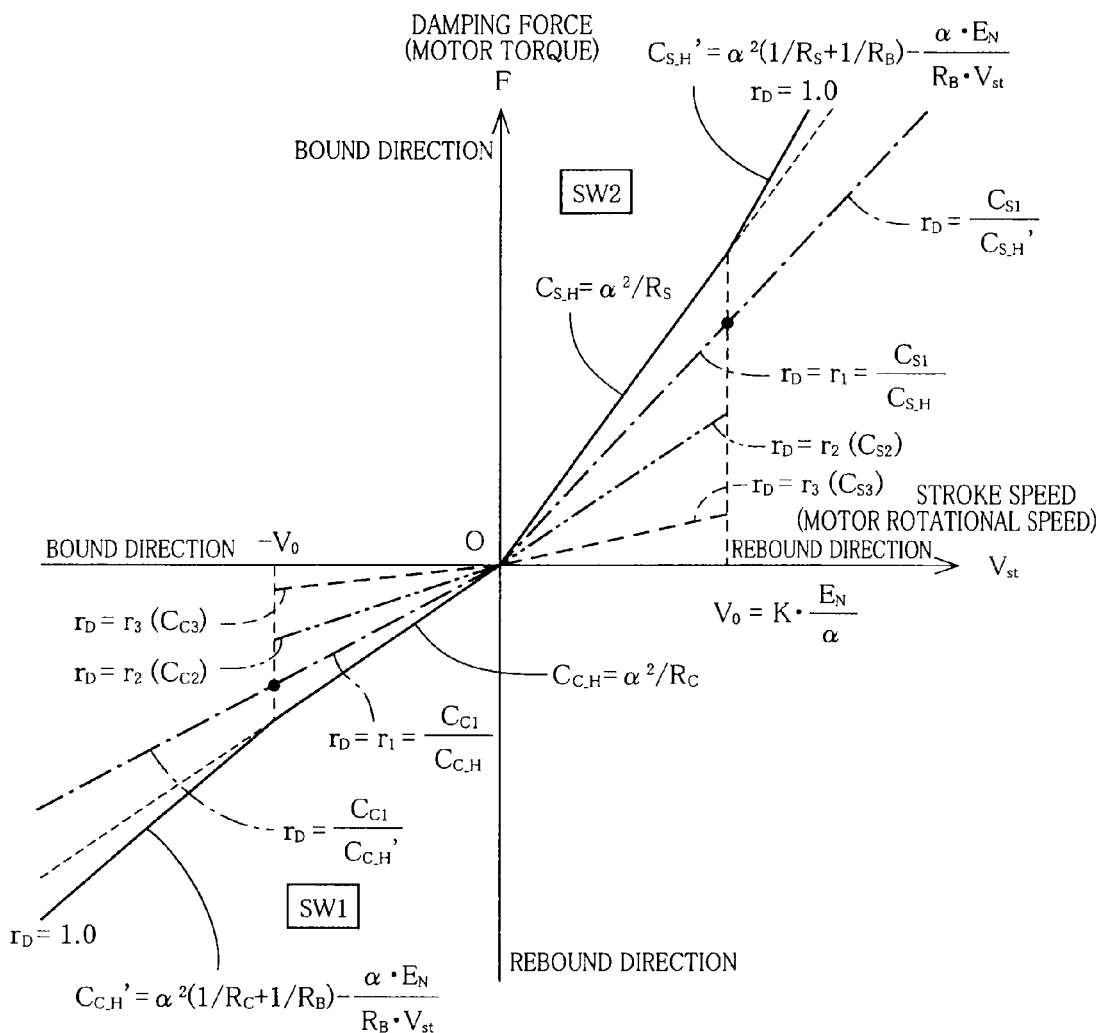
FIG. 6 is a view showing a relationship between rotational speed and torque of the electromagnetic motor of FIG. 2, in other words, a relationship between speed of relative motion of the sprung portion and the unsprung portion and damping force generated by the electromagnetic damper.

FIG. 6 shows the damping coefficients $C_C*$, $C_S*$ determined as described above in the present damper system, in other words, the target duty ratios $r_{DSW1}$, $r_{DSW2}$ of the switching elements 108, 114. In the present damper system, the ratio between the damping coefficient $C_{C1}$ of the first switching element 108 and the damping coefficient $C_{S1}$ of the second switching element 114 with respect to the sprung-resonance-frequency-range component and the ratio between the resistance value $R_C$ of the first resistor 110 and the resistance value $R_S$ of the second resistor 112 are made equal to each other. Accordingly, the duty ratio $r_{DSW1}$ where the first switching element 108 establishes the damping coefficient $C_{C1}$ and the duty ratio $r_{DSW2}$ where the second switching element 114 establishes the damping coefficient $C_{S1}$ may be the same duty ratio, i.e., $r_1$, in a range in which the electromotive force E is lower than the nominal voltage $E_N$ of the battery 120. This is true of the damping coefficients $C_{C2}$, $C_{S2}$ with respect to the unsprung-resonance-frequency-range component and the damping coefficients $C_{C3}$, $C_{S3}$ with respect to the intermediate-frequency-range component, and the duty ratio with respect to the unsprung-resonance-frequency-range component is made equal to $r_2$ while the duty ratio with respect to the intermediate-frequency-range component is made equal to $r_3$.

iii) Other Control of Auxiliary Adjuster

The ECU 200 permits the above-described auxiliary adjuster to have functions other than those described above depending upon situations. For instance, in an instance where the remaining energy amount of the battery 120 has been decreased, it is desirable to increase a regenerative current to the battery 120. To this end, where an actual voltage $E_B$ of the battery 120 detected by the voltage sensor 206 becomes lower than a set voltage $E_0$ and the stroke speed Vst becomes larger than a value $V_1$ that corresponds to the actual voltage $E_B$, the duty ratio $r_D$ of the switching element designated as the auxiliary adjuster is made equal to 1.0 for maximizing the magnitude of the regenerative current to the battery 120.

In an instance where a relatively large input from the unsprung portion continues and the motor 46 is suffering from a large load, there is a risk that the motor 46 may be damaged. Where the temperature T of the motor 46 detected by the temperature sensor 204 is higher than a set temperature $T_0$, it is estimated that the load on the motor 46 is large. In this case, the duty ratio $r_D$ of the switching element designated as the auxiliary adjuster is made equal to 0, thereby reducing the load on the motor 46.

iv) Adjustment of Regenerative Current to Battery

The voltage of the battery 120 varies to a certain degree. Where the electric power supplied from the battery 120 to electrically loaded portions mounted on the vehicle becomes large, for instance, the voltage of the battery 120 is lowered. In this case, the generated current of the motor 46 tends to readily flow to the battery 120, and the regenerative current to the battery 120 is larger than that in a case where the voltage of the battery 120 is high. That is, in the case where the voltage of the battery 120 is lowered, the damping force of the electromagnetic damper 10 becomes larger as compared to the case where the voltage of the battery 120 is high. In view of this, in the present damper system, the third switching element 126 is controlled so as to reduce the regenerative current when the voltage of the battery 120 is lowered, thereby suppressing an increase in the damping force of the electromagnetic damper 10. More specifically, where the actual voltage $E_B$ of the battery 120 detected by the voltage sensor 206 becomes lower than the nominal voltage $E_N$, the duty ratio $r_{DSW3}$ of the third switching element 126 as a target is calculated according to the following formula:

$$r_{DSW3} = E_B/E_N$$

The third switching element 126 is controlled so as to be opened and closed under the thus determined duty ratio, so that the regenerative current is decreased and the damping force of the electromagnetic damper 10 is restrained from being increased.

v) How to Deal with Failures

There will be next explained how to deal with failures occurred in the external circuit 90. As failures in the external circuit 90, there may occur a failure, for instance, in which the electric current does not pass through the first resistor 110 or the second resistor 112 due to a break or disconnection therein or the like by heat generation. When such a failure occurs, the generated current does not flow through the corresponding connection passage in which the failure-suffering resistor is disposed. Accordingly, no damping force is generated with respect to the relative motion of the sprung and unsprung portions that corresponds to the connection passage, so that the vehicle stability is deteriorated. In the present damper system, the first relay 154 is placed in the ON state when such a failure occurs in the first resistor 110 while the second relay 156 is placed in the ON state when such a failure occurs in the second resistor 112.

Whether or not the failure that the electric current does not pass through the first and second resistors 110, 112 is judged on the basis of the stroke sensor 202 and two Schmitt triggers 220, 222 which are disposed between the external circuit 90 and the ECU 200. The Schmitt trigger 220 is configured to perform an output where the potential of the point G in the external circuit 90 exceeds a first threshold and to stop the output where the potential of the point G becomes lower than a second threshold that is lower than the first threshold. Another Schmitt trigger 222 is configured such that the output state and the non-output state are switched therebetween depending upon the potential of the point H in the external circuit 90. Where there is no output from the Schmitt triggers 220, 222 to the ECU 200 in spite of detection of the stroke speed higher than a speed corresponding to the first threshold of the Schmitt triggers 220, 222 by the stroke sensor 202, it is judged that there has occurred a failure in which the electric current does not pass through the first resistor 110 or the second resistor 112. Which one of the first resistor 110 and the second resistor 112 is suffering from the failure is judged by the sign of the detected stroke speed.

As described above, in the present damper system, the generated current caused by the approaching motion of the sprung portion and the unsprung portion toward each other flows through the first auxiliary resistor 150 in place of the first resistor 110 even where the failure in which the electric current does not pass through the first resistor 110 occurs. Further, the generated current caused by the separating motion of the sprung portion and the unsprung portion away from each other flows through the second auxiliary resistor 152 in place of the second resistor 112 even where the failure in which the electric current does not pass through the second resistor 112 occurs. Accordingly, even where the failure in which the electric current does not pass through the firs resistor 110 or the second resistor 112 occurs, it is possible to execute the normal control described above, and the vehicle stability is not deteriorated. The passage GG'F' in the external circuit 90 functions as a first-resistor bypass passage which bypasses the first resistor 110 while the passage HH'F' in the external circuit 90 functions as a second-resistor bypass passage which bypasses the second resistor 112.

As another failure in the external circuit 90, there may occur a failure in which, in the circuit diagram shown in FIG. 4, the electric current does no pass through the first switching element 108 or the second switching element 114, more specifically, a failure the switching element is placed in the open state due to a fault of the switching element per se or a fault of the ECU 200. When such a failure occurs, the generated current does not flow through the connection passage in which the failure-suffering switching element is disposed. Accordingly, no damping force is generated with respect to the relative motion of the sprung and unsprung portions that corresponds to the connection passage, so that the vehicle stability is deteriorated. In the present damper system, even where the first switching element 108 suffers from such a failure, the electric current flows through the first Zener diode 140 disposed in parallel with the first switching element 108 where there is generated an electromotive force that exceeds a breakdown voltage of the first Zener diode 140. Hence, the damping force can be generated upon receiving a large input from the unsprung portion. Further, even where the second switching element 114 suffers from such a failure, the second Zener diode 142 disposed in parallel with the second switching element 114 functions in a manner similar to the first Zener diode 140.

In other words, the external circuit 90 includes a first-adjuster bypass passage which bypasses the first switching element 108 and in which the electric current is allowed to flow from a side of the first terminal 100 to a side of the second terminal 102 only where the electromotive force of the motor 46 caused by the approaching motion of the sprung portion and the unsprung portion toward each other exceeds a prescribed voltage, and the passage C'G'G in the external circuit 90 functions as the first-adjuster bypass passage. Further, the external circuit 90 includes a second-adjuster bypass passage which bypasses the second switching element 114 and in which the electric current is allowed to flow from a side of the second terminal 102 to a side of the first terminal 100 only where the electromotive force of the motor 46 caused by the separating motion of the sprung portion and the unsprung portion away from each other exceeds a prescribed voltage, and the passage D'H'H in the external circuit 90 functions as the second-adjuster bypass passage.

The above-indicated two Zener diodes 140, 142 are configured such that the generated current flows therethrough when the electromotive force of the motor 46 exceeds the breakdown voltages of the respective Zener diodes 140, 142 even if the failure in which the electric current does not pass through the first switching element 108 or the second switching element 114 has not occurred. That is, in a situation in which the vehicle stability is needed upon a large input from the unsprung portion, it is possible to generate a stable damping force without requiring the control of the switching elements 108, 114.

<Control Flow of External Circuit>

Figure 7:
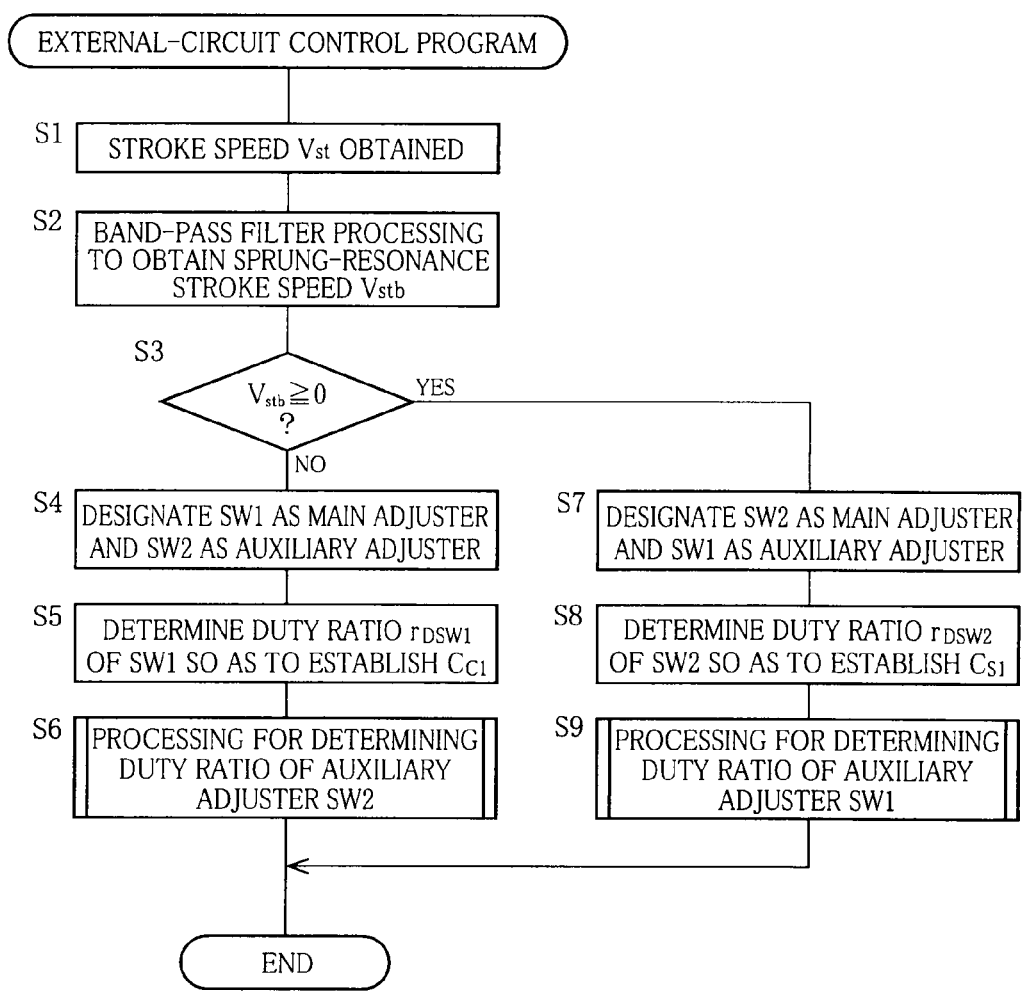
FIG. 7 is a flow chart showing an external-circuit-control program executed by an external-circuit controller shown in FIG. 1.

The control of the external circuit 90 described above is executed such that an external-circuit control program indicated by a flow chart of FIG. 7 is repeatedly implemented by the ECU 200 at short time intervals (e.g., several milliseconds), with an ignition switch of the vehicle placed in an ON state. Hereinafter, there will be briefly explained the flow of the control referring to the flow chart. The external-circuit control program is executed for each of the four electromagnetic dampers 10 provided for the respective four wheels 12. In the following description, there will be explained processing by the program performed on one electromagnetic damper 10, for the interest of brevity.

In the control program, in step 1 (hereinafter abbreviated as "S1" and other steps are similarly abbreviated), the stroke speed Vst is obtained on the basis of the detected value of the stroke sensor 202. S1 is followed by S2 in which the band-pass filter processing for the sprung resonance frequency range is performed on the stroke speed Vst, and the sprung-resonance stroke speed Vstb which is the sprung-resonance-frequency-range component of the stroke speed Vst is calculated. Subsequently, in S3, it is judged, on the basis of the sign of the sprung-resonance stroke speed Vstb, which one of the approaching motion and the separating motion is indicated by the value of the sprung-resonance-frequency-range component of the relative motion of the sprung portion and the unsprung portion.

Where it is judged in S3 that the sprung-resonance stroke speed Vstb is negative and indicates the approaching motion, S4 is implemented to designate the first switching element 108 as the main adjuster and designate the second switching element 114 as the auxiliary adjuster. S4 is followed by S5 in which the duty ratio $r_{DSW1}$ of the first switching element 108 designated as the main adjuster is determined according to the above formula so as to establish the damping coefficient $C_{C1}$ with respect to the sprung-resonance-frequency-range component. S5 is followed by S6 in which processing for determining the duty ratio of the auxiliary adjuster is executed for the second switching element 114 designated as the auxiliary adjuster.

On the other hand, where it is judged in S3 that the sprung-resonance stroke speed Vstb is positive and indicates the separating motion, S7 is implemented to designate the second switching element 114 as the main adjuster and designate the first switching element 108 as the auxiliary adjuster. S7 is followed by S8 in which the duty ratio $r_{DSW2}$ of the second switching element 114 designated as the main adjuster is determined according to the above formula so as to establish the damping coefficient $C_{S1}$ with respect to the sprung-resonance-frequency-range component. S8 is followed by S9 in which processing for determining the duty ratio of the auxiliary adjuster is executed for the first switching element 108 designated as the auxiliary adjuster.

Figure 8:
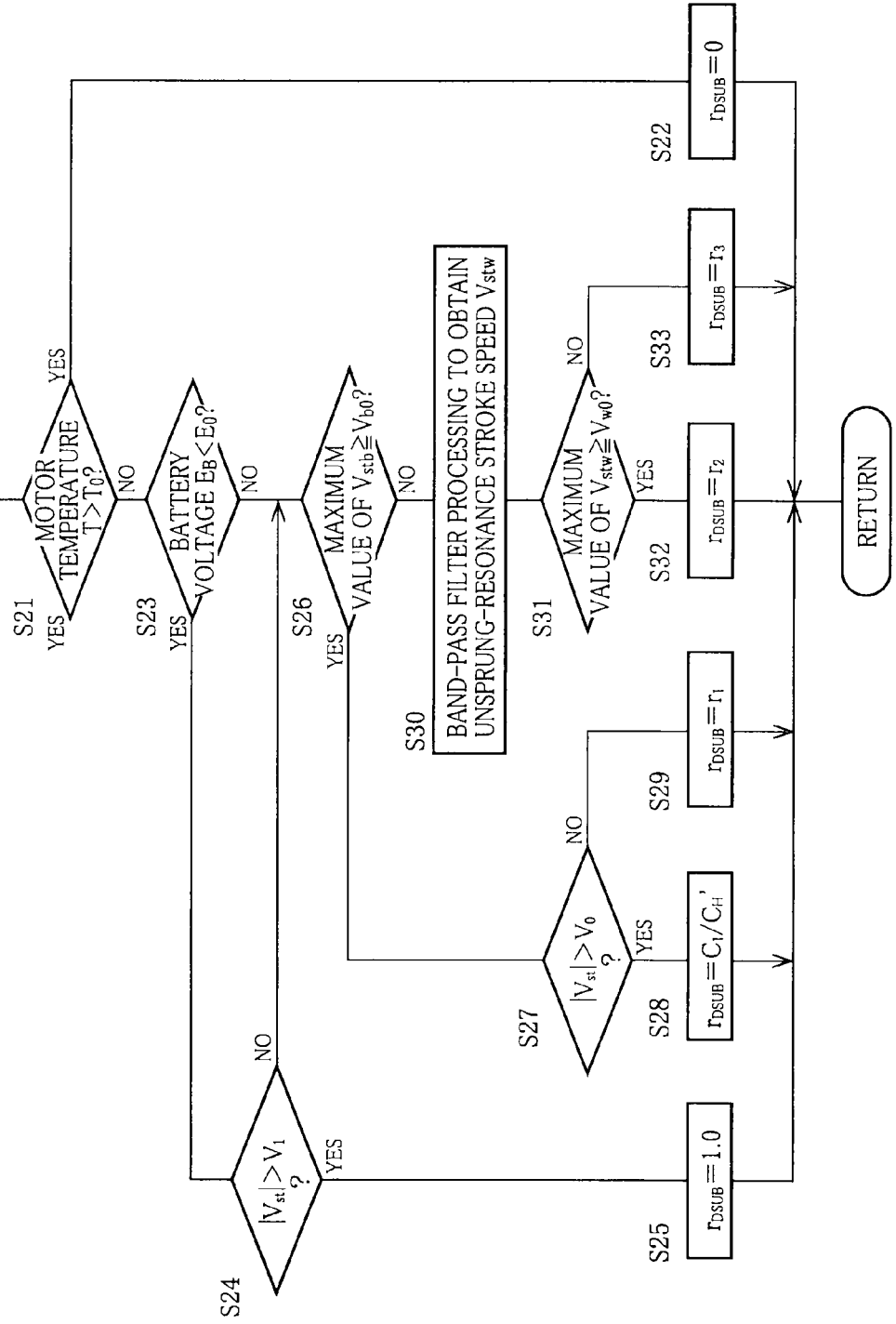
FIG. 8 is a flow chart showing an auxiliary-adjuster-duty-ratio-determining-processing sub routine executed in the external-circuit-control program of FIG. 7.

The above-described processing for determining the duty ratio of the auxiliary adjuster is executed such that an auxiliary-adjuster-duty-ratio-determining-processing sub routine indicated by a flow chart of FIG. 8 is implemented. In the processing, S21 is initially implemented to judge whether or not the temperature T of the motor 46 detected by the temperature sensor 204 is higher than the set temperature $T_0$. Where the temperature T of the motor 46 is higher than $T_0$, S22 is implemented in which the duty ratio of the switching element designated as the auxiliary adjuster is made equal to 0, thereby reducing the load on the motor 46.

Where the temperature T of the motor 46 is not higher than $T_0$, S23 is implemented to judge whether or not the actual voltage $E_B$ of the battery 120 detected by the voltage sensor 206 is lower than the set voltage $E_0$. Where the actual voltage $E_B$ of the battery 120 is lower than the set voltage $E_0$, S24 is implemented to judge whether or not the stroke speed Vst is larger than a value $V_1$ that corresponds to the actual voltage $E_B$ of the battery 120. Where the stroke speed Vst is larger than $V_1$, S25 is implemented in which the duty ratio of the switching element designated as the auxiliary adjuster is made equal to 1.0. In this instance, a part of the generated current of the motor 46 is regenerated to the battery 120. Accordingly, the regenerative current flowing to the battery 120 is maximized by setting the duty ratio of the auxiliary adjuster at 1.0.

On the other hand, where the actual voltage $E_B$ of the battery 120 is lower than the set voltage $E_0$ or where the stroke speed Vst is larger than $V_1$, S26 is implemented to obtain the maximum value of the sprung-resonance stroke speed Vstb within the prescribed time period $t_0$ between the current time point and the certain previous time point that precedes the current time point by $t_0$, and it is judged whether or not the value is larger than the set speed $Vb_0$. Where the maximum value of the sprung-resonance stroke speed Vstb is larger than the set speed $Vb_0$, S27-S29 are implemented in which the duty ratio of the auxiliary adjuster is determined according to the above formula so as to establish the damping coefficient $C_{S1}$ or $C_{C1}$ with respect to the sprung-resonance-frequency-range component.

On the other hand, where the maximum value of the sprung-resonance stroke speed Vstb is smaller than the set speed $Vb_0$, S30 is implemented in which the band-pass filter processing for the unsprung resonance frequency range is performed on the stroke speed Vst obtained in S1, so as to calculate the unsprung-resonance stroke speed Vstw which is the unsprung-resonance-frequency-range component of the stroke speed Vst. Subsequently, S31 is implemented to obtain the maximum value of the unsprung-resonance stroke speed Vstw within the prescribed time period $t_0$ between the current time point and the certain previous time point that precedes the current time point by $t_0$, and it is judged whether or not the value is larger than the set speed $Vw_0$. Where the maximum value of the unsprung-resonance stroke speed Vstw is larger than the set speed $Vw_0$, S32 is implemented in which the duty ratio of the auxiliary adjuster is set at $r_2$ so as to establish the damping coefficient $C_{S2}$ or $C_{C2}$ with respect to the unsprung-resonance-frequency-range component. On the other hand, where the maximum value of the unsprung-resonance stroke speed Vstw is smaller than the set speed $Vw_0$, S33 is implemented in which the duty ratio of the auxiliary adjuster is set at $r_3$ so as to establish the damping coefficient $C_{S3}$ or $C_{C3}$ with respect to the intermediate-frequency-range component. After the duty ratio of the auxiliary adjuster has been determined according to a series of processing described above, one execution of the external-circuit control program is ended.

<Functional Structure of ECU>

Figure 9:
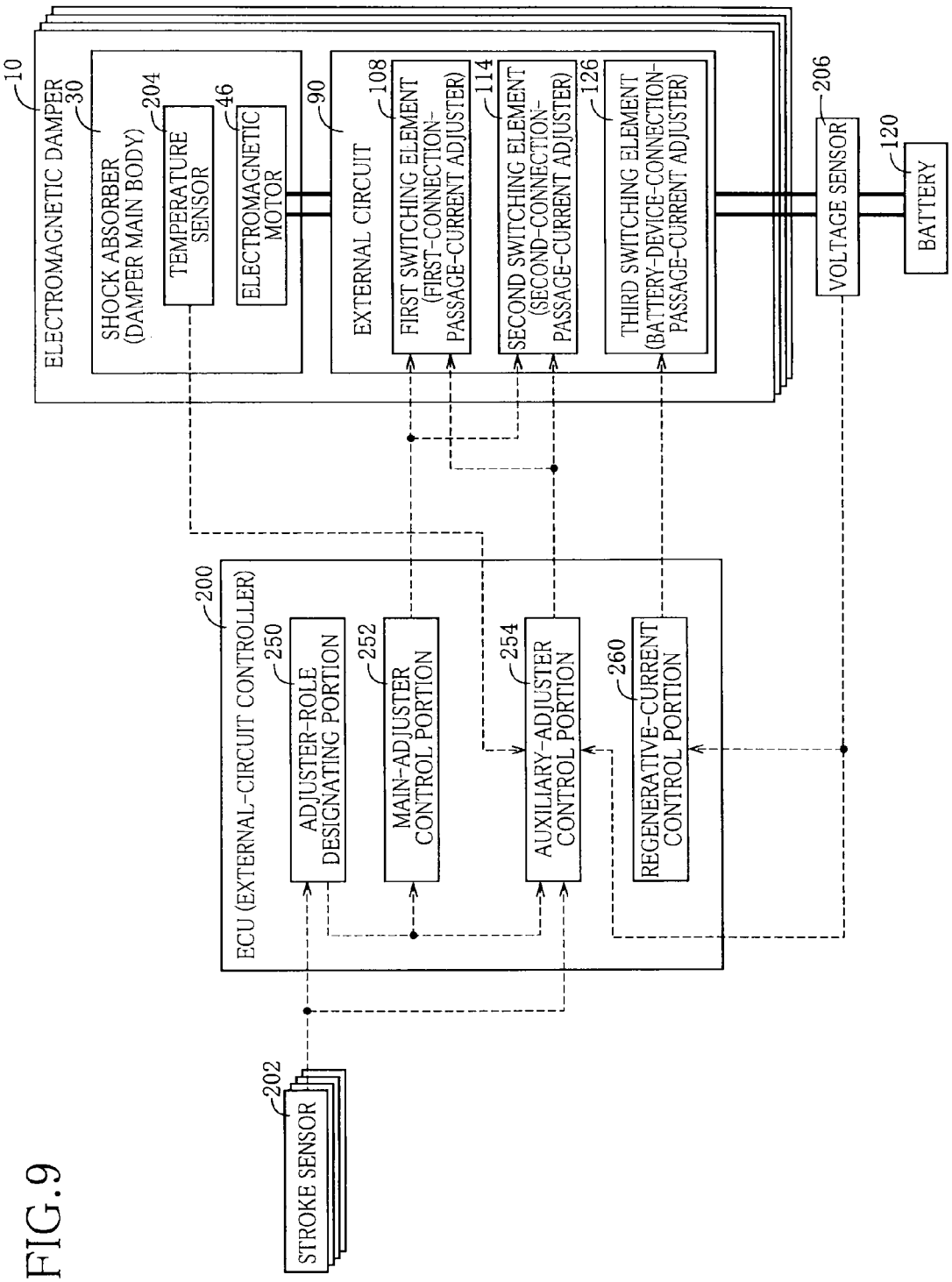
FIG. 9 is a block diagram showing functions of the external-circuit controller of FIG. 1.

Functions of the above-described ECU 200 are schematically shown in the functional block diagram of FIG. 9. According to the functions described above, the ECU 200 includes: an adjuster-role designating portion 250 configured to designate the two switching elements 108, 114 as one and the other of the main adjuster and the auxiliary adjuster, such that the two switching elements 108, 114 take the respective roles; an main-adjuster control portion 252 configured to control one of the first switching element 108 and the second switching element 114 that is designated as the main adjuster; and an auxiliary-adjuster control portion 254 configured to control one of the first switching element 108 and the second switching element 114 that is designated as the auxiliary adjuster. In the ECU 200 of the present damper system, the adjuster-role designating portion 250 is constituted by including a portion that executes the processing in S1-S4 and S7 of the external-circuit control program. The main-adjuster control portion 252 is constituted by including a portion that executes the processing in S5 and S8 of the external-circuit control program. The auxiliary-adjuster control portion 254 is constituted by including a portion that executes the processing in S6 and S9 of the external-circuit control program, namely, a portion that executes the auxiliary-adjuster-duty-ratio-determining-processing sub routine. The ECU 200 further includes a regenerative-current control portion 260 configured to control the regenerative current by controlling the third switching element 126 as the battery-device-connection-passage-current adjuster, for suppressing a fluctuation of the damping force when a part of the generated current is regenerated to the battery 120.

REFERENCE SIGNS LIST

10: electromagnetic damper 12: wheel 14: vehicle body 20: spring•absorber Assy 22: lower arm (unsprung portion) 24: mount portion (sprung portion) 30: shock absorber (damper main body) 32: coil spring (suspension spring) 40: threaded rod 42: nut 44: ball screw mechanism (motion converting mechanism) 46: electromagnetic motor 52: motor shaft 60: polar body 62: permanent magnet 64: commutator 66: brush 90: external circuit 100: first terminal 102: second terminal 104: first diode (first rectifier) 106: second diode (second rectifier) 108: first switching element [SW1] (first-connection-passage-current adjuster) 110: first resistor [$R_C$] 112: second resistor [$R_S$] 114: second switching element [SW2] (second-connection-passage-current adjuster) 120: battery (battery device) 122: third diode 124: fourth diode 126: third switching element [SW3] (battery-device-connection-passage-current adjuster) 128: source resistance [$R_B$] 140: first Zener diode 142: second Zener diode 150: first auxiliary resistor 152: second auxiliary resistor 154: first relay (first open/close device) 156: second relay (second open/close device) 200: electronic control unit (ECU, external-circuit controller) 202: stroke sensor [St] 204: temperature sensor [T] 206: voltage sensor [$E_B$] 220, 222: Schmitt trigger 250: adjuster-role designating portion 252: main-adjuster control portion 254: auxiliary-adjuster control portion 260: regenerative-current control portion Passage CFEB: first connection passage Passage DFEA: second connection passage Passage CGI: first high-potential-side connection passage Passage FEB: first low-potential-side connection passage Passage DHI: second high-potential-side connection passage Passage FEA: second low-potential-side connection passage Passage GG'F: first-resistor bypass passage Passage HH'F: second-resistor bypass passage Passage C'G'G: first-adjuster bypass passage Passage D'H'H: second-adjuster bypass passage $R_C$: resistance value of the first resistor $R_S$: resistance value of the second resistor $C_C$: damping coefficient at the time of approach $C_S$: damping coefficient at the time of separation $C_{C1}$, $C_{S1}$: damping coefficient with respect to the sprung-resonance-frequency-range component $C_{C2}$, $C_{S2}$: damping coefficient with respect to the unsprung-resonance-frequency-range component $C_{C3}$, $C_{S3}$ damping coefficient with respect to the intermediate-frequency-range component Vst: stroke speed Vstb: sprung-resonance stroke speed Vstw: unsprung-resonance stroke speed $r_{DSW1}$: duty ratio of SW1 $r_{DSW2}$: duty ratio of SW2 α: motor constant $E_N$: nominal voltage of the battery $E_B$: actual voltage of the battery T: motor temperature

The invention claimed is:
1. A damper system for a vehicle which is mounted on the vehicle and which comprises an electromagnetic damper configured to generate a damping force with respect to a motion of a sprung portion and an unsprung portion toward each other and a motion thereof away from each other, wherein the electromagnetic damper includes:
an electromagnetic motor;
a motion converting mechanism configured to convert the motions of the sprung portion and the unsprung portion toward and away from each other into a motion of the electromagnetic motor and vice versa; and
an external circuit disposed outside the electromagnetic motor and including (A) a first connection passage in which an electric current is allowed to flow from a first terminal as one of two terminals of the electromagnetic motor to a second terminal as the other of the two terminals while an electric current is prohibited from flowing from the second terminal to the first terminal and (B) a second connection passage in which the electric current is allowed to flow from the second terminal to the first terminal of the electromagnetic motor while the electric current is prohibited from flowing from the first terminal to the second terminal,
wherein the electromagnetic damper is configured to generate the damping force that depends on an electromotive force of the electromagnetic motor, with respect to the motion of the sprung portion and the unsprung portion toward each other by permitting a generated current by the electromagnetic motor to flow through the first connection passage and with respect to the motion of the sprung portion the unsprung portion away from each other by permitting the generated current by the electromagnetic motor to flow through the second connection passage,
wherein the external circuit further includes: (C) a first-connection-passage-current adjuster provided in the first connection passage and configured to adjust the electric current that flows from the first terminal to the second terminal; and (D) a second-connection-passage-current adjuster provided in the second connection passage and configured to adjust the electric current that flows from the second terminal to the first terminal,
wherein the damper system comprises an external-circuit controller configured to control an electric current that flows in the electromagnetic motor by controlling the external circuit,
wherein the external-circuit controller is configured to control the generated current caused by the motion of the sprung portion and the unsprung portion toward each other by controlling the first-connection-passage-current adjuster and to control the generated current caused by the motion of the sprung portion and the unsprung portion away from each other by controlling the second-connection-passage-current adjuster, and
wherein the external-circuit controller includes:
(a) a main-adjuster control portion which is configured to designate the first-connection-passage-current adjuster as a main adjuster where a sprung-resonance-frequency-range component that is a component of a relative vibration of the sprung portion and the unsprung portion in a sprung resonance frequency range is a value indicative of the motion of the sprung portion and the unsprung portion toward each other, to designate the second-connection-passage-current-adjuster as the main adjuster where the sprung-resonance-frequency-range component is a value indicative of the motion of the sprung portion and the unsprung portion away from each other, and to perform, on one of the first-connection-passage-current adjuster and the second-connection-passage-current adjuster that is designated as the main adjuster, a first control for mainly damping the relative vibration of the sprung portion and the unsprung portion; and
(b) an auxiliary-adjuster control portion which is configured to designate the second-connection-passage-current adjuster as an auxiliary adjuster where the sprung-resonance-frequency-range component is the value indicative of the motion of the sprung portion and the unsprung portion toward each other, to designate the first-connection-passage-current adjuster as the auxiliary adjuster where the sprung-resonance-frequency-range component is the value indicative of the motion of the sprung portion and the unsprung portion away from each other, and to perform, on one of the first-connection-passage-current adjuster and the second-connection-passage-current adjuster that is designated as the auxiliary adjuster, a second control for assisting the damping of the relative vibration of the sprung portion and the unsprung portion by the first control.

2. The damper system according to claim 1, wherein the external-circuit controller is configured to control the first-connection-passage-current adjuster and the second-connection-passage-current adjuster so as to control a damping coefficient of the electromagnetic damper, and
wherein the external-circuit controller is configured to control the first-connection-passage-current adjuster and the second-connection-passage-current adjuster, such that the damping coefficient of the electromagnetic damper with respect to the motion of the sprung portion and the unsprung portion toward each other and the damping coefficient of the electromagnetic damper with respect to the motion of the sprung portion and the unsprung portion away from each other are made different from each other.

3. The damper system according to claim 1 wherein the auxiliary-adjuster control portion is configured to control the one of the first-connection-passage-current adjuster and the second-connection-passage-current adjuster that is designated as the auxiliary adjuster, such that a damping coefficient of the electromagnetic damper becomes a value suitable for damping an unsprung-resonance-frequency-range component that is a component of the relative vibration of the sprung portion and the unsprung portion in an unsprung resonance frequency range.

4. The damper system according to claim 3, wherein the auxiliary-adjuster control portion is configured to control the one of the first-connection-passage-current adjuster and the second-connection-passage-current adjuster that is designated as the auxiliary adjuster, such that the damping coefficient of the electromagnetic damper becomes a value suitable for damping the unsprung-resonance-frequency-range component in a situation in which an intensity of the unsprung-resonance-frequency-range component is higher than a prescribed value.

5. The damper system according to claim 1, wherein the auxiliary-adjuster control portion is configured to control the one of the first-connection-passage-current adjuster and the second-connection-passage-current adjuster that is designated as the auxiliary adjuster, such that the damping coefficient of the electromagnetic damper becomes a value suitable for damping the unsprung-resonance-frequency-range component in a situation in which an intensity of the sprung-resonance-frequency-range component is higher than a prescribed value.

6. The damper system according to claim 3, wherein the auxiliary-adjuster control portion is configured to control the one of the first-connection-passage-current adjuster and the second-connection-passage-current adjuster that is designated as the auxiliary adjuster, such that the damping coefficient of the electromagnetic damper becomes a value suitable for damping a component in a frequency range between the sprung resonance frequency range and the unsprung resonance frequency range, in a situation in which an intensity of the sprung-resonance-frequency-range component is lower than a prescribed value and an intensity of the unsprung-resonance-frequency-range component is lower than a prescribed value.

7. The damper system according to claim 1, wherein the first-connection-passage-current adjuster and the second-connection-passage-current adjuster are constituted by respective switching elements each configured to place a corresponding one of the first connection passage and the second connection passage selectively in an electrically connected state in which an electric current flows therethrough and in an electrically shut-off state in which the electric current does not flow therethrough,
wherein the external-circuit controller is configured to control the generated current by the electromagnetic motor by controlling each of the switching elements such that the electrically connected state and the electrically shut-off state are alternately and repeatedly established and by controlling a duty ratio of each of the switching elements that is a ratio determined on the basis of a time during which the electrically connected state is established and a time during which the electrically shut-off state is established, and
wherein the external-circuit controller is configured not to change the duty ratio of each of the switching elements that respectively constitute the first-connection-passage-current adjuster and the second-connection-passage-current adjuster, depending upon through which one of the first connection passage and the second connection passage the generated current is flowing.

8. The damper system according to claim 1, wherein the external circuit includes:
a first-adjuster bypass passage which bypasses the first-connection-passage-current adjuster and in which an electric current is allowed to flow from a side of the first terminal to a side of the second terminal where the electromotive force of the electromagnetic motor caused by the motion of the sprung portion and the unsprung portion toward each other exceeds a prescribed voltage; and
a second-adjuster bypass passage which bypasses the second-connection-passage-current adjuster and in which an electric current is allowed to flow from a side of the second terminal to a side of the first terminal where the electromotive force of the electromagnetic motor caused by the motion of the sprung portion and the unsprung portion away from each other exceeds a prescribed voltage.

9. The damper system according to claim 1, wherein the external circuit includes: a first resistor which is provided in the first connection passage and which functions as a resistance to the electric current that flows from the first terminal to the second terminal; and a second resistor which is provided in the second connection passage and which functions as a resistance to the electric current that flows from the second terminal to the first terminal.

10. The damper system according to claim 9, wherein a resistance value of the first resistor and a resistance value of the second resistor are made different from each other.

11. The damper system according to claim 9,
wherein the external circuit includes:
- a first-resistor bypass passage which bypasses the first resistor;
- a first auxiliary resistor which is provided in the first-resistor bypass passage and which functions as a resistance to an electric current that flows through the first-resistor bypass passage;
- a first open/close device configured to place the first-resistor bypass passage selectively in a state in which the electric current flows therethrough and in a state in which the electric current does not flow therethrough;
- a second-resistor bypass passage which bypasses the second resistor;
- a second auxiliary resistor which is provided in the second-resistor bypass passage and which functions as a resistance to an electric current that flows through the second-resistor bypass passage;
- a second open/close device configured to place the second-resistor bypass passage selectively in a state in which the electric current flows therethrough and in a state in which the electric current does not flow therethrough, wherein the first-resistor bypass passage is placed by the first open/close device in the state in which the electric current does not flow therethrough under normal conditions and in the state in which the electric current flows therethrough in case of a failure that the electric current does not flow through the first resistor, and wherein the second-resistor bypass passage is placed by the second open/close device in the state in which the electric current does not flow therethrough under normal conditions and in the state in which the electric current flows therethrough in case of a failure that the electric current does not flow through the second resistor.

12. The damper system according to claim 1,
wherein the external circuit includes a battery-device connection passage in which an electric current is allowed to flow from one of the two terminals of the electromagnetic motor that is at a high potential to a high-potential-side terminal of a battery device installed on the vehicle and an electric current is allowed to flow from a low-potential-side terminal of the battery device to the other of the two terminals of the electromagnetic motor that is at a low potential, and wherein the damper system is configured such that a part of the generated current by the electromagnetic motor flows through the battery-device connection passage where the electromotive force of the electromagnetic motor exceeds a voltage of the battery device.

13. The damper system according to the claim 12, wherein the external circuit includes a battery-device-connection-passage-current adjuster configured to adjust the electric current that flows through the battery-device connection passage.

14. The damper system according to claim 1, wherein the main-adjuster control portion is configured to control the one of the first-connection-passage-current adjuster and the second-connection-passage-current adjuster that is designated as the main adjuster, such that a damping coefficient of the electromagnetic damper becomes a value suitable for damping the sprung-resonance-frequency-range component.

15. A damper system for a vehicle which is mounted on the vehicle and which comprises an electromagnetic damper configured to generate a damping force with respect to a motion of a sprung portion and an unsprung portion toward each other and a motion thereof away from each other, wherein the electromagnetic damper includes:
- an electromagnetic motor;
- a motion converting mechanism configured to convert the motions of the sprung portion and the unsprung portion toward and away from each other into a motion of the electromagnetic motor and vice versa; and
- an external circuit disposed outside the electromagnetic motor and including (A) a first connection passage in which an electric current is allowed to flow from a first terminal as one of two terminals of the electromagnetic motor to a second terminal as the other of the two terminals while an electric current is prohibited from flowing from the second terminal to the first terminal and (B) a second connection passage in which the electric current is allowed to flow from the second terminal to the first terminal of the electromagnetic motor while the electric current is prohibited from flowing from the first terminal to the second terminal, wherein the electromagnetic damper is configured to generate the damping force that depends on an electromotive force of the electromagnetic motor, with respect to the motion of the sprung portion and the unsprung portion toward each other by permitting a generated current by the electromagnetic motor to flow through the first connection passage and with respect to the motion of the sprung portion the unsprung portion away from each other by permitting the generated current by the electromagnetic motor to flow through the second connection passage, wherein the external circuit further includes: (C) a first-connection-passage-current adjuster provided in the first connection passage and configured to adjust the electric current that flows from the first terminal to the second terminal; and (D) a second-connection-passage-current adjuster provided in the second connection passage and configured to adjust the electric current that flows from the second terminal to the first terminal, wherein the first-connection-passage-current adjuster and the second-connection-passage-current adjuster are constituted by respective switching elements each configured to place a corresponding one of the first connection passage and the second connection passage selectively in an electrically connected state in which an electric current flows therethrough and in an electrically shut-off state in which the electric current does not flow therethrough, wherein the damper system comprises an external-circuit controller configured to control an electric current that flows in the electromagnetic motor by controlling the external circuit, wherein the external-circuit controller is configured to control the generated current caused by the motion of the sprung portion and the unsprung portion toward each other by controlling the first-connection-passage-current adjuster and to control the generated current caused by the motion of the sprung portion and the unsprung portion away from each other by controlling the second-connection-passage-current adjuster, wherein the external-circuit controller is configured to control the generated current by the electromagnetic motor by controlling each of the switching elements that respectively constitute the first-connection-passage-current adjuster and the second-connection-passage-current adjuster such that the electrically connected state and the electrically shut-off state are alternately and repeatedly established and by controlling a duty ratio of each of the switching elements that is a ratio determined on the basis of a time during which the electrically connected state is established and a time during which the electrically shut-off state is established, and wherein the external-circuit controller is configured not to change the duty ratio of each of the switching elements that respectively constitute the first-connection-passage-current adjuster and the second-connection-passage-current adjuster, depending upon through which one of the first connection passage and the second connection passage the generated current is flowing.

* * * * *